US009088398B2

(12) United States Patent
Rhodes et al.

(10) Patent No.: US 9,088,398 B2
(45) Date of Patent: Jul. 21, 2015

(54) LOW-POWER WIRELESS VEHICLE LOCATING UNIT

(71) Applicant: LoJack Corporation, Canton, MA (US)

(72) Inventors: Jesse L. Rhodes, Franklin, MA (US); Steven A. Zelubowski, Sr., Andover, MA (US)

(73) Assignee: LoJack Corporation, Canton, MA (US)

( * ) Notice: Subject to any disclaimer, the term of this patent is extended or adjusted under 35 U.S.C. 154(b) by 242 days.

(21) Appl. No.: 13/896,674

(22) Filed: May 17, 2013

(65) Prior Publication Data

US 2014/0010210 A1 Jan. 9, 2014

Related U.S. Application Data

(60) Provisional application No. 61/648,954, filed on May 18, 2012.

(51) Int. Cl.
*H04W 4/00* (2009.01)
*H04L 5/00* (2006.01)
(Continued)

(52) U.S. Cl.
CPC ............. *H04L 5/0053* (2013.01); *B61L 25/025* (2013.01); *G01S 5/0018* (2013.01); *G01S 5/0221* (2013.01); *G01S 19/16* (2013.01); *G08G 1/205* (2013.01); *G08G 9/00* (2013.01); *H04W 52/0254* (2013.01); *H04W 76/023* (2013.01); *H04W 84/12* (2013.01)

(58) Field of Classification Search
CPC .................................................... H04L 5/0053
See application file for complete search history.

(56) References Cited

U.S. PATENT DOCUMENTS 5,691,980 A  11/1997 Welles, II et al.
7,079,550 B2 * 7/2006 Padovani et al. ............. 370/468
(Continued)

FOREIGN PATENT DOCUMENTS

WO    WO-9859256 A2    12/1998
WO    WO-03032501 A2    4/2003
WO    WO-2007038189 A2    4/2007

OTHER PUBLICATIONS

International Search Report and Written Opinion in PCT/US13/41623 mailed Oct. 8, 2013.

*Primary Examiner* — Iqbal Zaidi
(74) *Attorney, Agent, or Firm* — Goodwin Procter LLP

(57) ABSTRACT

Methods of, systems for, and articles of manufacture for wireless communication between a vehicle locating unit and peripheral devices that are disposed on or in the same object, the method including the steps of adapting the peripheral devices to generate transmission signals to be received by the vehicle locating unit; generating transmission signals by at least one of the peripheral devices; adapting the vehicle locating unit to listen for the transmission signals for a first period of time during a second period of time that is longer than the first period of time; acknowledging detected transmission signals from any of the peripheral devices; upon acknowledgement, establishing a communication link between the vehicle locating unit and a corresponding source of the detected transmission signals; and communicating data between the vehicle locating unit and the corresponding source of the detected transmission signals in accordance with discrete timing information.

25 Claims, 13 Drawing Sheets

(51) Int. Cl.
*G08G 1/00* (2006.01)
*G08G 9/00* (2006.01)
*B61L 25/02* (2006.01)
*G01S 19/16* (2010.01)
*G01S 5/00* (2006.01)
*G01S 5/02* (2010.01)
*H04W 52/02* (2009.01)
*H04W 76/02* (2009.01)
*H04W 84/12* (2009.01)

(56) References Cited

U.S. PATENT DOCUMENTS

| | | | |
|---|---|---|---|
| 7,928,837 B2 | 4/2011 | Drew et al. | |
| 8,055,403 B2 | 11/2011 | Lowrey et al. | |
| 8,463,276 B2 * | 6/2013 | Chou et al. | 455/446 |
| 2013/0077610 A1 | 3/2013 | Amini et al. | |

* cited by examiner

LOW-POWER WIRELESS VEHICLE LOCATING UNIT

CROSS-REFERENCE TO RELATED APPLICATIONS

This application claims priority to and the benefit of U.S. Provisional Patent Application No. 61/648,954 filed on May 18, 2012, which is incorporated herein in its entirety by reference.

FIELD OF THE INVENTION

Methods of wireless communication are disclosed and, more specifically, a wireless local area network including a vehicle location unit (VLU) and a peripheral device(s) and requiring significantly lower power consumption in the VLU and low latency in data transfer between the VLU and the peripheral device(s).

BACKGROUND OF THE INVENTION

Vehicle location units (VLU) are installed in motor vehicles as a deterrent to theft. A VLU is structured and arranged to communicate with other devices in the vehicle—generally referred to as "peripheral devices"—that provide additional functionalities, e.g., vehicle immobilization upon detecting unauthorized movement of the vehicle, alarms, cell modems, Global Positioning System units, On-Board Diagnostic tools, and so forth. Currently, to communicate with a peripheral device the VLU needs a wired serial port, which requires a direct, i.e., a hard wired, connection between each peripheral device and the VLU. Alternatively, a wireless transceiver may be disposed in series with the wired serial port. Hard wiring, however, facilitates locating the VLU. Wireless transceivers, on the other hand, do not enable the VLU to communicate with multiple peripheral devices simultaneously. Moreover, the VLU thus configured necessitates power consumption that jeopardizes the life expectancy of its battery.

SUMMARY OF THE INVENTION

In various aspects, the invention generally provides methods and supporting systems that enable wireless communication between a vehicle locating unit (VLU) and peripheral devices that are disposed on or in the same object as the VLU.

In a first aspect, the vehicle locating unit and the peripheral devices include receiver portions and transmitter portions. The transmitter portion of each of the peripheral devices are adapted to generate transmission signals to be received by the receiver portion of the vehicle locating unit. Transmission signals are generated by the peripheral device(s) and the receiver portion of the vehicle locating unit is adapted to listen for the transmission signals from any of the peripheral devices for a first period of time during a second period of time, which is longer than the first period of time; upon acknowledgment of detected transmission signals from the plurality peripheral devices a communication link is established between the vehicle locating unit and a corresponding source of the detected transmission signals and data are sent between the vehicle locating unit and the corresponding source of the detected transmission signals in accordance with discrete timing information.

In some embodiments, the transmission signals from the peripheral devices may include a signal having a prolonged preamble providing indicia of a desire to communicate data with the vehicle locating unit. In such cases, the prolonged preamble has a transmission length longer than the second period of time. In certain implementations of the invention, an estimated likelihood that a received signal corresponds to the signal having a prolonged preamble using a counter may be derived.

In other embodiments, acknowledging detected transmission signals can include: detecting transmission signals from the peripheral devices; waking up the transmitter portion and a memory in the vehicle locating unit; preparing the receiver portion of the vehicle locating unit to receive authentication information from the corresponding source of the detected transmission signals; listening for the authentication information from the corresponding source of the detected transmission signals; and/or identifying the corresponding source of the detected transmission signals using the authentication information, e.g., by comparing the received authentication information to authentication information stored in the memory. Listening for the authentication information can include listening for a third period of time during a fourth period of time, wherein the third period of time is longer than the first period of time and the fourth period of time is shorter than the third period of time. Further, listening for the authentication information from the peripheral devices may include listening for an authentication code that is unique to a corresponding peripheral device. The authentication code can be transmitted by the corresponding source of detected transmission signals during a transmit-and-receive cycle having a cyclical time that is shorter than the third period of time.

In other embodiments, establishing a communication link includes transmitting discrete timing information for communication of data between the vehicle locating unit and the corresponding source of the detected transmission signals. For example, transmitting discrete timing information may include transmitting a listening pattern having at least one timing period of a pre-established length delineated between a first boundary and a second boundary, on which transmissions between the vehicle locating unit and the corresponding source of detected transmission signals will be timed. Further, a discrete time slot within the listening pattern that is unique to the corresponding source of detected transmission signals during which transmissions between the vehicle locating unit and the corresponding source of detected transmission signals is timed as is a vehicle locating unit listening time offset within the listening pattern during which transmissions between the vehicle locating unit and the corresponding source of detected transmission signals. For example, the discrete time slot can occur within one or two timing periods after the first boundary of the timing period while the time offset can occur within one or two timing periods after the first boundary of the timing period. Advantageously, the corresponding source of detected transmission signals synchronizes its timing clock in accordance with the transmitted listening pattern.

In still other implementations, communicating data may include at least one of the corresponding sources of the detected transmission signals or the vehicle locating unit transmitting an initiation signal approximately at a boundary of a timing period. Furthermore, communicating data may include transmitting data from the corresponding source of the detected transmission signals to the vehicle locating unit and/or transmitting data from the vehicle locating unit to the corresponding source of the detected transmission signals at a next boundary of a timing period. More particularly, the communication of data may include assigning a unique N-value to each of the corresponding sources of detected transmissions, wherein N is an integer greater than one;

reserving a unique data transfer period for each corresponding source of detected transmission signals, wherein the unique data transfer period comprises N number of timing periods delineated between a unique first boundary and a unique second boundary that no other peripheral device has; and transmitting data from at least one of the corresponding source of detected transmission signals to the vehicle locating unit or from the vehicle locating unit to the corresponding source of detected transmission signals within one or two timing periods after the unique second boundary.

Other embodiments of the invention can include monitoring a connection link between the vehicle locating unit and the corresponding source of detected transmission signals using a linked monitoring packet exchange and comprising establishing a priority for timing a communication of data between the vehicle locating unit and the plurality of peripheral devices.

Still other versions of the invention include adapting each of the peripheral devices to transmit an intent signal to other peripheral devices to announce an intention to communicate data at a next timing boundary and adapting each of the peripheral devices to listen for the intent signal from another peripheral device. Moreover, after a peripheral device has signaled an intention to communicate data, transmitting a data packet from the discrete device to the vehicle locating unit at the next timing boundary. Furthermore, the peripheral devices may be adapted to avoid synchronizing on a data exchange packet whose transmission is delayed because timing for the communication of data was delayed by a communication of data having a higher priority.

In a particular embodiment, the methods include determining a location and a temporal point of occurrence of an exception event. If the location of the occurrence of the exception event is in the vehicle locating unit, the methods may further include reserving a unique data transfer period for the corresponding source of detected transmission signals, wherein the unique data transfer period comprises N number of timing periods, and wherein N is an integer greater than one. Each timing period has an equal temporal length and a first and a second boundary, and the N number of timing periods of the unique data transfer period are delineated between a unique first boundary and a unique second boundary not assigned to any other peripheral device. A data package may be transmitted from the vehicle locating unit to the corresponding source of detected transmission signals at the next unique boundary if the exception event occurs within one timing period of the next unique boundary, otherwise transmitting the data package at a next period boundary. On the other hand, if the location of the occurrence of the exception event is in any of the plurality of peripheral devices a unique data transfer period is reserved for the corresponding source of detected transmission signals, wherein the unique data transfer period includes more than one timing periods, each having a timing period of equal temporal length and a first and a second boundary. The timing periods of the unique data transfer period are delineated between a unique first boundary and a unique second boundary not assigned to any other peripheral device, and a discrete time slot during the unique data transfer period is reserved and the discrete time slot is unique to the corresponding source of detected transmission signals for the purpose of data communication. A data package from the corresponding source of detected transmission signals to the vehicle locating unit may be transmitted during the corresponding source's reserved time slot if the exception event occurs within one time period of the next unique boundary of the unique data transfer period, otherwise a shortened prolonged preamble signal from the corresponding source of detected transmission signals to the vehicle locating unit may be transmitted at a next time period boundary.

In another aspect, the invention generally discloses methods of and supporting systems that enable wireless communication of occurrence of an exception event in a vehicle locating unit and/or any peripheral devices that are linked to the vehicle locating unit via a network. In this aspect, a location and a temporal point of occurrence of the exception event are determined and transmission is a function of these two variables. In a first implementation, if the location of the occurrence of the exception event is in the vehicle locating unit, a unique data transfer period for the corresponding source of detected transmission signals is reserved. In some embodiments, the unique data transfer period includes N number of timing periods, and wherein N is an integer greater than one. Each timing period has an equal temporal length and a first and a second boundary. The timing periods of the unique data transfer period are delineated between a unique first boundary and a unique second boundary not assigned to any other peripheral device. A data package may be transmitted from the vehicle locating unit to the corresponding source of detected transmission signals at the next unique boundary if the exception event occurs within one timing period of the next unique boundary, otherwise the data package may be transmitted at a next period boundary.

In a second implementation, if the location of the occurrence of the exception event is in any of the peripheral devices, a unique data transfer period for the corresponding source of detected transmission signals is reserved. In some embodiments, the unique data transfer period comprises N number of timing periods and N is an integer greater than one. Each timing period has an equal temporal length and a first and a second boundary. The timing periods of the unique data transfer period are delineated between a unique first boundary and a unique second boundary not assigned to any other peripheral device and a discrete time slot during the unique data transfer period is reserved and the discrete time slot is unique to the corresponding source of detected transmission signals for the purpose of data communication. A data package may be transmitted from the corresponding source of detected transmission signals to the vehicle locating unit during the corresponding source's reserved time slot if the exception event occurs within one time period of the next unique boundary of the unique data transfer period, otherwise a shortened prolonged preamble signal from the corresponding source of detected transmission signals to the vehicle locating unit may be transmitted at the next time period boundary.

In yet another aspect, the invention provides an article of manufacture for wireless communication between a vehicle locating unit and peripheral devices that are disposed on or in the same object. The vehicle locating unit and peripheral devices include receiver portions and transmitter portions. Computer-readable program portions of instructions are embedded on the article of manufacture. In some embodiments, the transmitter portion of each of the peripheral devices is adapted to generate transmission signals to be received by the receiver portion of the vehicle locating unit and transmission signals by a peripheral device(s) are generated. The receiver portion of the vehicle locating unit is adapted to listen for the transmission signals from any of the peripheral devices for a first period of time during a second period of time, which is longer than the first period of time. Upon acknowledgement of detected transmission signals from any of peripheral devices, a communication link between the vehicle locating unit and a corresponding source of the detected transmission signals is established and data are sent between the vehicle locating unit and the corresponding source of the detected transmission signals in accordance with discrete timing information.

In a further aspect, an article of manufacture for wireless communication of occurrence of an exception event to a vehicle locating unit and/or in any peripheral devices that are linked to the vehicle locating unit via a network is disclosed. Computer-readable program portions of instructions are embedded on the article of manufacture. In some embodiments, a location and a temporal point of occurrence of the exception event is determined. If the location of the occurrence of the exception event is in the vehicle locating unit, a unique data transfer period for the corresponding source of detected transmission signals is reserved. In some embodiments, the unique data transfer period includes N number of timing periods, wherein N is an integer greater than one. Each timing period has an equal temporal length and a first and a second boundary. The timing periods of the unique data transfer period are delineated between a unique first boundary and a unique second boundary not assigned to any other peripheral device. A data package from the vehicle locating unit to the corresponding source of detected transmission signals may be transmitted at a next unique boundary if the exception event occurs within one timing period of the next unique boundary, otherwise a data package may be transmitted at a next period boundary. On the other hand, if the location of the occurrence of the exception event is in any of the peripheral devices, a unique data transfer period for the corresponding source of detected transmission signals is reserved. The unique data transfer period includes N number of timing periods, wherein N is an integer greater than one. Each timing period has an equal temporal length and a first and a second boundary. The timing periods of the unique data transfer period are delineated between a unique first boundary and a unique second boundary not assigned to any other peripheral device and a discrete time slot during the unique data transfer period is reserved. The discrete time slot is unique to the corresponding source of detected transmission signals for the purpose of data communication. A data package from the corresponding source of detected transmission signals to the vehicle locating unit may be transmitted during the corresponding source's reserved time slot if the exception event occurs within one time period of the next unique boundary of the unique data transfer period, otherwise a shortened prolonged preamble signal from the corresponding source of detected transmission signals to the vehicle locating unit may be transmitted at the next time period boundary. Further aspects of the invention include a low-power wireless communication system. The system includes a vehicle locating unit and peripheral devices that are disposed on or in the same object as the vehicle locating unit. The vehicle locating unit has a receiver portion, a transmitter portion, and a processing device with memory, and each of the peripheral devices is adapted to generate transmission signals and to receive transmission signals. In some embodiments, the receiver portion of the vehicle locating unit is adapted to listen for the transmission signals from any of the peripheral devices for a first period of time during a second period of time, which is longer than the first period of time, and the processing device of the vehicle locating unit is adapted to acknowledge detection of transmission signals from any of the peripheral devices, to establish a communication link between the vehicle locating unit and a corresponding source of detected transmission signals via the transmitter portion. Establishment of a communication link enables communication of data between the vehicle locating unit and the corresponding source of the detected transmission signals in accordance with discrete timing information.

In some implementations, discrete timing information may include a listening pattern, having a timing period(s) of a pre-established length delineated between a first boundary and a second boundary, on which transmissions between the vehicle locating unit and the corresponding source of detected transmission signals may be timed; a discrete time slot within the listening pattern that is unique to the corresponding source of detected transmission signals during which transmissions between the vehicle locating unit and the corresponding source of detected transmission signals may be timed; and a vehicle locating unit listening time offset within the listening pattern during which transmissions between the vehicle locating unit and the corresponding source of detected transmission signals may be timed. In some versions, each of the peripheral devices may be adapted to transmit an intent signal to other peripheral devices to announce an intention to communicate data at a next timing boundary; to listen for the intent signal from another peripheral device; and to transmit a data packet from the discrete device to the vehicle locating unit at the next timing boundary.

In various implementations, the methods and systems for a wireless serial connection to a covertly-installed VLU that neither compromise the covertness of the VLU nor consume, on an average, more than 1 µA of supply current are disclosed. Communication latency of less than 60 seconds is disclosed. Simultaneous communication between the vehicle locating unit and several peripheral devices may be supported.

In various versions, a wireless communication protocol allows several peripheral devices to wirelessly connect to a vehicle locating unit simultaneously is disclosed. The protocol facilitates a substantial reduction in vehicle locating unit power consumption, which allows the vehicle locating unit to operate on a self-contained battery, without necessitating connection to the vehicle's electrical system.

In various implementations, the protocol effectively creates a wireless local area network (WLAN) with the vehicle locating unit as the network hub. To reduce power consumption of the vehicle locating unit further, the protocol also minimizes the average current within the vehicle locating unit that is associated with the WLAN operation while simultaneously minimizing latency within the WLAN, which is to say that the protocol minimizes the delay before an exchange of data within the WLAN, either from a peripheral device to the vehicle locating unit or from the vehicle locating unit to a peripheral device, occurs.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

The terms and expressions employed herein are used as terms and expressions of description and not of limitation, and there is no intention, in the use of such terms and expressions, of excluding any equivalents of the features shown and described or portions thereof.

Throughout the description, where apparatus and systems are described as having, including, and/or comprising specific elements and/or components, or where processes and methods are described as having, including, and/or comprising specific steps, it is contemplated that, additionally, there are apparatus and systems of the present invention that consist essentially of and/or consist of the recited components, and that there are processes and methods according to the present invention that consist essentially of and/or consist of the recited processing steps.

It should be understood that, absent words to the contrary, the order of steps or order for performing certain actions is immaterial so long as the invention remains operable. Moreover, two or more steps or actions can be conducted simultaneously.

Figure 1:
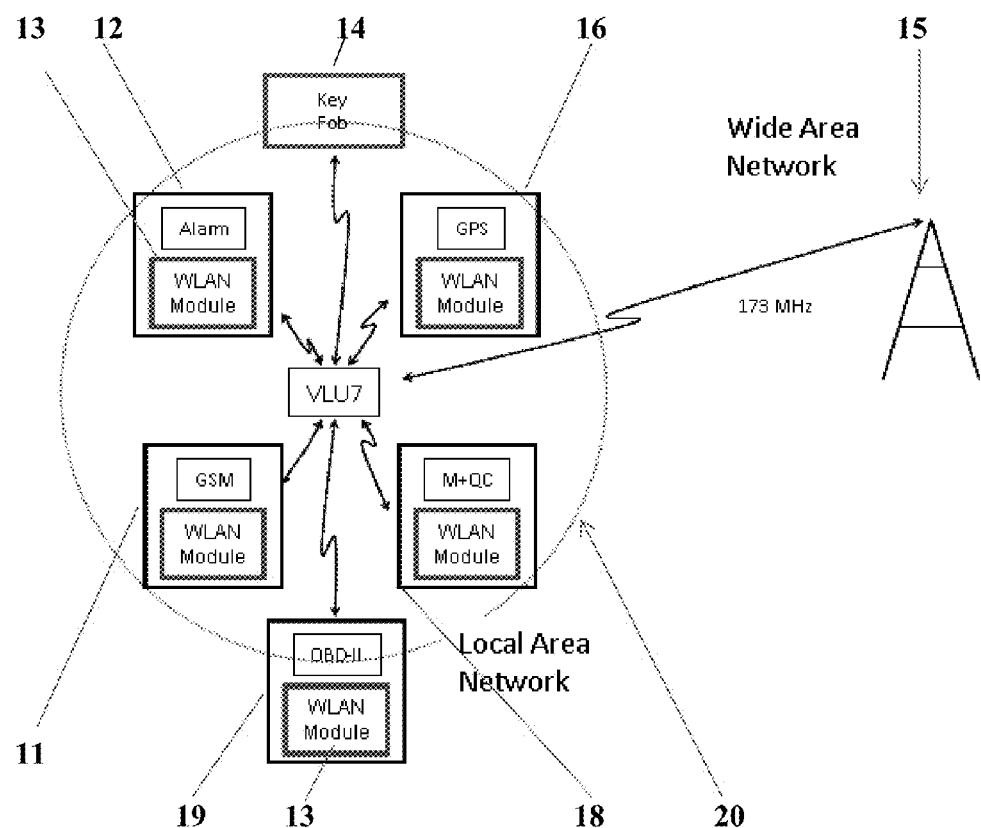
FIG. 1 shows a diagram of an exemplary embodiment of a vehicle location unit (VLU) within a wide area network (WAN) and a wireless local area network (WLAN).

Referring to FIG. 1, a vehicle locating unit (VLU) 10 and one or more peripheral devices that are disposed on or within a common object, e.g., a motor vehicle, are shown. As used herein a motor vehicle may include an automobile, bicycle, motorcycle, boat, plane, truck, railcar, or any other method of transportation. For illustrative purposes only, the peripheral devices can include a Global System for Mobile Communication (GSM) device 11, a vehicle alarm, i.e. anti-theft, system 12, a Global Positioning System (GPS) 16, a maintenance and quality control (M+QC) processing device 18, an on-board diagnostic system 19, and a keyfob 14. Those of ordinary skill in the art can appreciate that one or more of the peripheral devices can be absent from a particular combination and/or that other peripheral devices not shown or discussed herein can be added to the particular combination without violating the scope and spirit of this disclosure. For the purpose of this disclosure, the term "peripheral device(s)" will be used generically to refer collectively to the devices that are adapted to communicate with the VLU 10.

Each peripheral device is equipped with a module 13 that is adapted to enable wireless communication between the corresponding peripheral device and the VLU 10 within a local area network 20. The VLU 10 as well as one or more of the peripheral devices can also communicate with, for example, the Internet or a wide-area stolen vehicle network 15, e.g., via a wide-area network (WAN). The wireless local area network 20 (WLAN), comprising the VLU 10 and the peripheral devices, can operate under FCC Part 15 and the WAN link can operate at a frequency of 173 MHz. Those of ordinary skill in the art can appreciate that a myriad of frequency bands for both the WLAN 20 and WAN 15 are equally usable. The VLU 10 and the peripheral devices forming the WLAN 20 adhere to the rules of the wireless communication protocol summarized herein. Although the wireless communication protocol provides a means of linking the peripheral devices and the VLU 10 with a WAN 15, in some situations, WAN connectivity is not relevant to the WLAN 20, and as such, WAN connectivity is optional.

Various aspects and functions described, especially in connection with the wireless communication protocol, may be implemented as hardware or software on one or more processing devices. Furthermore, aspects in accord with the present invention may be located on a single processing device or may be distributed among a plurality of processing devices connected via a network(s), e.g., the WLAN 20, WAN 15, and so forth. Thus, the invention is not limited to executing the protocol on any particular system or group of systems. Moreover, aspects may be implemented in software, hardware, firmware or any combination of the three. Thus, aspects in accordance with the present invention may be implemented within methods, acts, systems, system elements, and components using a variety of hardware and software configurations.

One important characteristics of the WLAN communication protocol is simultaneously achieving both significantly lower VLU power consumption and low latency in data transfer. Low power consumption is desirable because the VLU 10 may be powered by a non-rechargeable battery that is expected to power the VLU 10 for several years, e.g., for at least ten years. Low power consumption can be achieved by exploiting the fact that the peripheral devices, most of which are electrically connected to the power source of the vehicle, do not have a similar, extraordinary power consumption requirement. Accordingly, many current-consuming tasks required of the wireless communication protocol, which otherwise might have to be performed by the VLU 10, can, instead, be transferred from the VLU 10 to the peripheral devices, even though the VLU 10 is viewed as the master node in or "hub" of the WLAN 20.

Another feature of this protocol is that data transfer can be initiated by any component or element in the system. Hence, all devices can either be the source of a data transfer or they can receive or "sink" data. As there may be a security element associated with the connections or links or there may be a need for reliable links, in some embodiments, the WLAN connections are periodically monitored for operational status, e.g., working as intended, link broken, and the like. The wireless communication protocol described herein may be used for in-vehicle applications, and it may be used in other applications in systems benefitting from low power consumption and low latency.

The WLAN communication protocol described herein allows the VLU 10 to actively but periodically listen for signals from a peripheral device(s). In various embodiments, the protocol establishes a wireless connection between any peripheral device and the VLU 10, monitors the connection between the VLU 10 and a discrete peripheral device(s), and facilitates the exchange of data among the peripheral device(s) that is connected to the VLU 10. Additional desirable features of the wireless communication protocol that impact the air-interface include maintaining an average current in the VLU 10 associated with the WLAN operation at 1 µA or less; the delay in establishing a link remains short, e.g., on the order of 30 seconds (although delay requirements may vary for different peripheral devices); when monitoring for "exception events," e.g., alarm conditions, the delay between the exception event and when that information reaches its destination in the WLAN 20 remains short, e.g., on the order of 30 seconds; the links among the VLU 10 and the peripheral devices are continuously monitored to ensure connectivity; data transfer may be initiated by either the VLU 10 or by a peripheral device; each peripheral device has less restriction on the power available for the wireless links compared to that on the VLU 10; the amount of program memory allocated for the WLAN communication protocol is small, e.g., less than 2 k bytes for one or more of the peripheral devices; the listening characteristics of the VLU 10 can vary at a given time depending on the number of peripheral devices linked to the VLU 10; the frequency of link monitoring can vary among linked peripheral devices; the VLU 10 has comparatively coarse control over timing, hence, the WLAN tasks may be preempted by other, higher-priority tasks; the frequency plan of communication protocol is configured to prevent linked devices from being "jammed" by other peripheral devices in discovery mode; detect jamming of the WLAN traffic, whether intentional or unintentional; and maintain the average current in the VLU 10 associated with WLAN 20 at an approximately constant level, or having a weak dependence on the number of peripheral devices attached, the weak dependence resulting from the wireless communication protocol.

In some embodiments, the VLU 10 and/or one or more of the peripheral devices can detect either the loss of an already established link, e.g., due to interference on a particular channel, or the presence of interference when no link has been established. In that situation, the VLU and/or one or more of the peripheral devices may proceed according to a predetermined sequence of alternate channels, to avoid the interference.

Figure 2A:
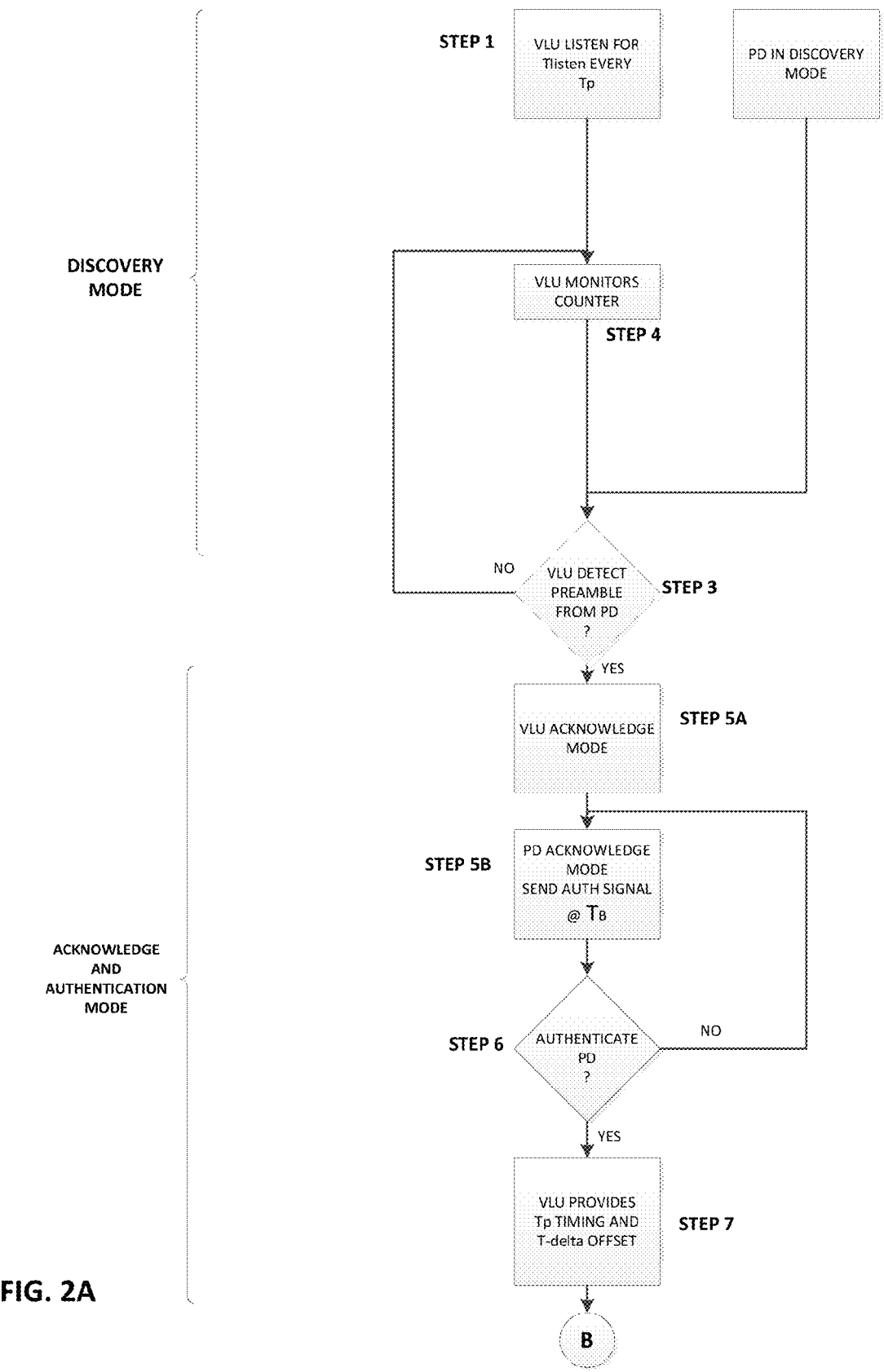
FIG. 2A shows a flow diagram of the discovery and acknowledgement and authentication phases of a WLAN connection in accordance with various embodiments of the present invention.
Figure 2B:
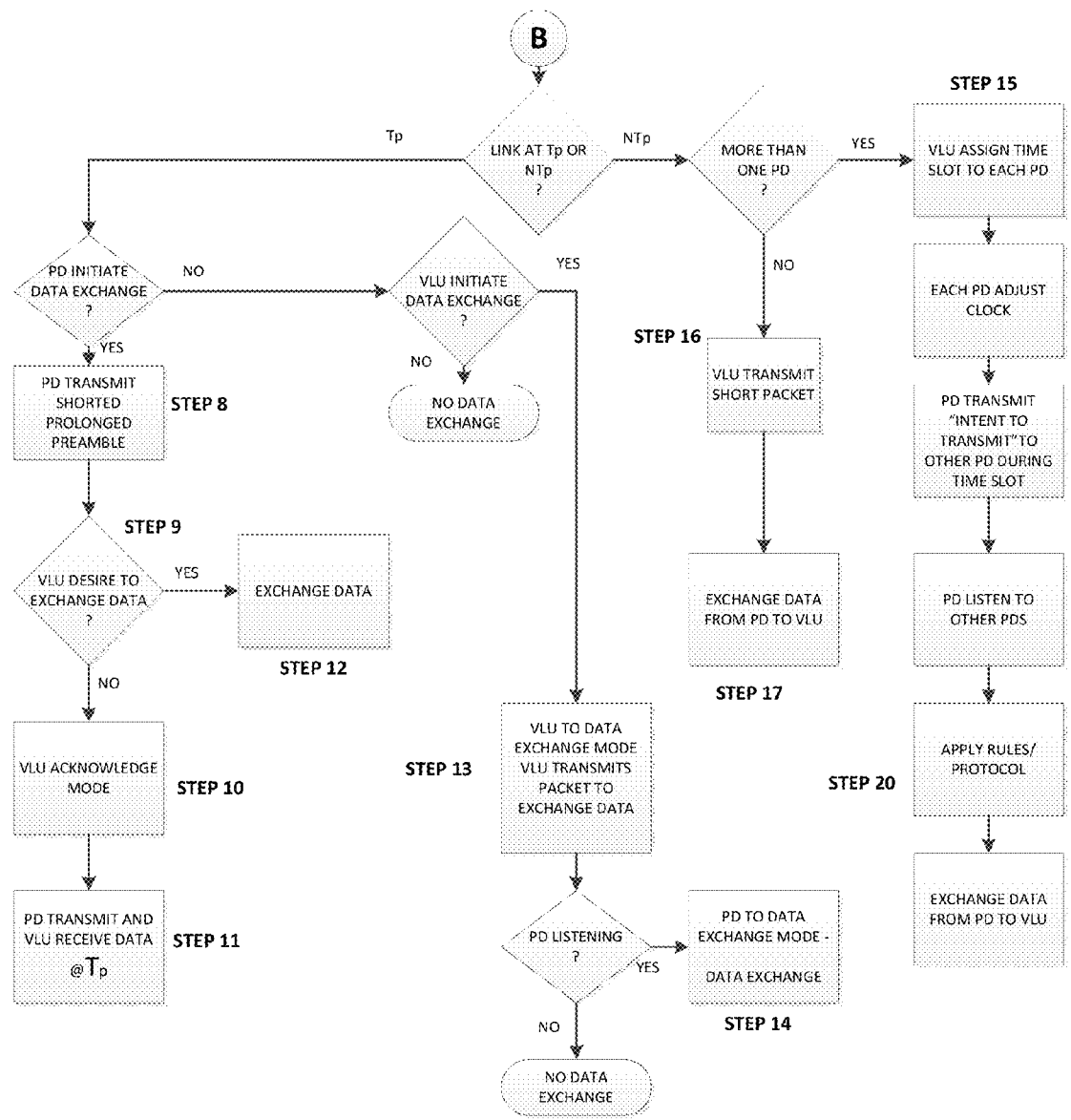
FIG. 2B shows a flow diagram of the data exchange and/or link monitoring phase of a WLAN connection in accordance with various embodiments of the present invention.

A VLU wireless communication protocol and, hence, a method of wireless communication between a VLU 10 and peripheral device(s) will now be described. The protocol and method involve listening for signals from a peripheral device(s) and establishing a wireless connection between the peripheral device(s) and the VLU 10 and monitoring the link connectivity and/or exchanging data with each peripheral device that is connected to the VLU 10. To that end, FIG. 2A and FIG. 2B show a sequence of tasks or phases that establish wireless communication between a peripheral device and a VLU 10. The first phase (FIG. 2A) constitutes a discovery phase or mode during which the VLU 10 and the peripheral device(s) seek each other in the network 20. After the VLU 10 and the peripheral device(s) have discovered each other, the second phase (FIG. 2A) includes acknowledging and authenticating steps or processes. In the final phase (FIG. 2B), a link is established for the purpose of data transfer or exchange and/or the connectivity of the link is monitored. Advantageously, a multi-phase implementation, e.g., two or three phases, can reduce the current requirements necessary to perform a listening pattern, i.e., to listen for $T_{listen}$ seconds every $T_p$ seconds. Indeed, by sequencing phases, the VLU 10 only uses what power it needs for that phase, which keeps current use low. Typically, current is increased only as necessary, e.g., to establish a link. Moreover, certain implementations of the method/protocol require a relatively small amount of memory, e.g., 1 k bytes or 512 bytes.

Figure 3:
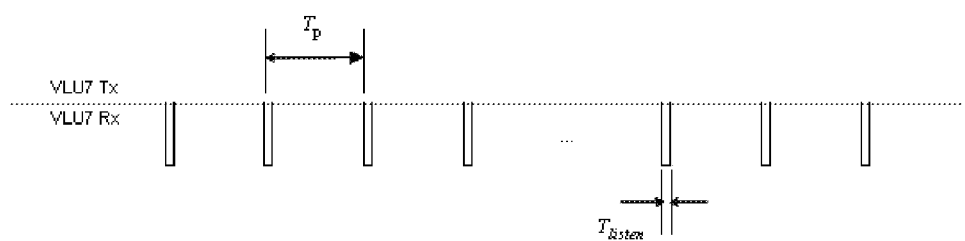
FIG. 3 shows a schematic of the duty cycle of a VLU in an at-rest state, i.e., a listening pattern, in accordance with various embodiments of the present invention.

During the initial "discovery" phase, there is no connection between the VLU 10 and a discrete peripheral device. In instances in which there is more than one peripheral device, even though the VLU 10 is linked to one peripheral device, the VLU 10 and the remaining, non-linked peripheral device(s) still perform discovery phase operations. Advantageously, because there is no connection between the VLU 10 and the remaining, non-linked peripheral devise, the VLU 10 continues to operate in a low-power consumption, "sleep" mode that includes actively listening for a signal from any peripheral device(s) (STEP 1) that wants to link to the VLU 10. For example, as shown in FIG. 3, during its discovery mode, the transmitter portion of the VLU 10 is dormant while the receiver portion of the VLU 10 operates on a duty cycle or listening pattern characterized by listening, i.e., being ON, every $T_p$ seconds for a duration of $T_{listen}$ seconds. At the end of the listening duration, i.e., after $T_{listen}$ seconds, the receiver portion of the VLU 10 "sleeps" until the next listening period. Typically, the majority of the power consumed by a VLU 10 while establishing a WLAN link is consumed while listening for $T_{listen}$ seconds every $T_p$ seconds. Accordingly, to minimize power needs, it is desirable to minimize $T_{listen}$ and/or maximize $T_p$. However, since $T_p$ contributes to latency in direct proportion and, moreover, is constrained by the application and by user requirements, it is preferable to address the power consumption issue by minimizing $T_{listen}$. $T_p$ can be different for different devices, reducing the current drain if certain peripheral devices can tolerate longer latency.

Meanwhile, when a peripheral device is first powered-up, it, too, enters a discovery phase (STEP 2) in which it actively listens for signals from the transmitter portion of the VLU 10 and/or attempts to establish a link with the VLU 10 for the purpose of initiating a transfer or an exchange of data. For the purpose of this disclosure, a data "exchange" is a bilateral transfer of data between the peripheral device and the VLU 10 while a data "transfer" is a unilateral transfer of data from one to the other. A "communication" of data can be either an exchange or a transfer of data. To initiate a data exchange/transfer, the peripheral device transmits a signal(s) with a "prolonged preamble" (STEP 3). Conventional packets, in contrast, typically include a preamble, a sync word, and data. Hence, by using a "prolonged preamble" instead of a conventional packet the $T_{listen}$ duration is minimized. Furthermore, this allows the use of a progressive wake-up procedure in the VLU 10, which also reduces current and power needs.

Figure 4:
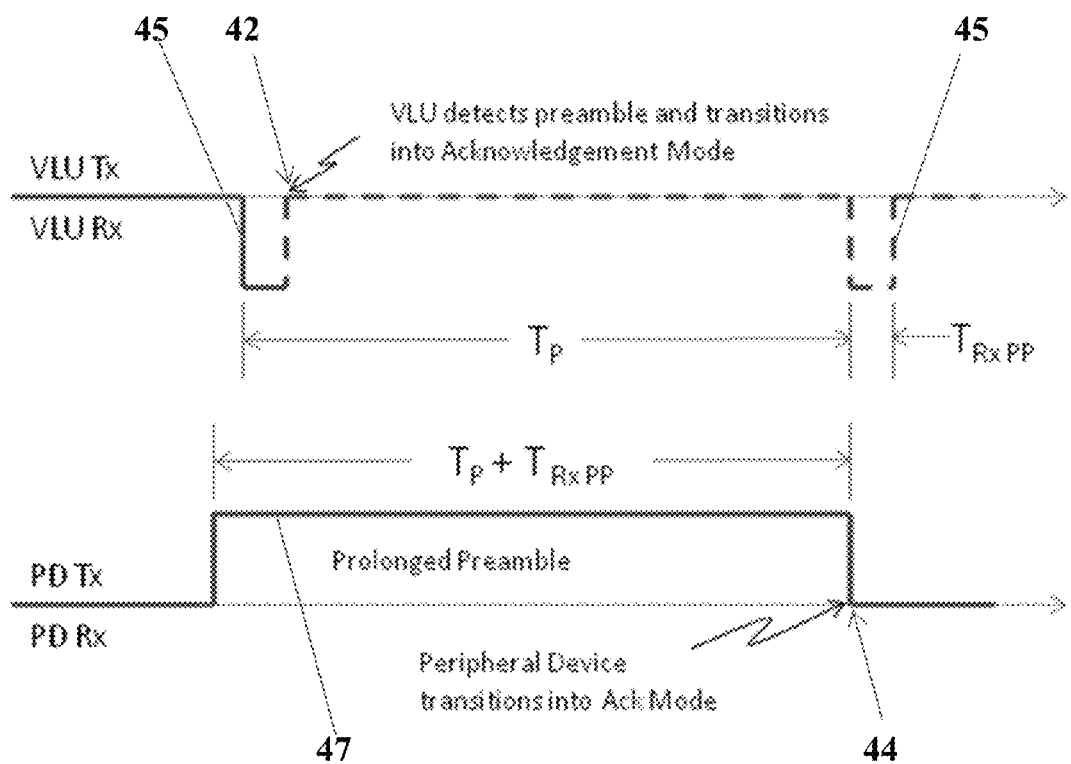
FIG. 4 illustrates a VLU listening pattern and a prolonged preamble signal transmitted by a peripheral device in accordance with various embodiments of the present invention.

The "prolonged preamble" signal is configured to be slightly longer in temporal length, i.e., measured in milliseconds, than a VLU listening period $T_p$. As shown in FIG. 4, making the "prolonged preamble" 47 last longer than the VLU listening period $T_p$, ensures that the receiver portion of the VLU 10 is able to recognize the "prolonged preamble" signal 47 during any single listening period $T_p$. Indeed, as shown in FIG. 4, the transmitter portion of the peripheral device generates a "prolonged preamble" signal 47, which is detected by the receiver portion of the VLU 10. Recognition of signals, and more specifically, signals with a "prolonged preamble" 47, whether previously linked to the VLU 10 or not, causes the VLU 10 to "wake-up," which is to say that other elements and components of the VLU 10 are powered up, which requires additional power consumption. For example, at the trailing edge 42 of the duty cycle or the listening pattern 45, the VLU 10, having detected the "prolonged preamble" signal 47, transitions to the acknowledgement phase or mode (STEP 5A). Similarly, at the trailing edge 44 of the "prolonged preamble" signal 47, the peripheral device also transitions to the acknowledgement phase or mode (STEP 5B). In some embodiments, the $T_p$ wake-up cycle, however, can be skipped.

As an alternative to receiving a prolonged preamble signal 47, a processing device in the VLU 10 may, instead, monitor a counter (STEP 4). The counter may be operatively disposed in the receiver portion of the VLU 10. Using results from the counter, the processing device may be further adapted to estimate the likelihood that a signal from a peripheral device is actually a prolonged preamble signal 47 from a peripheral device based on the count. This approach, eliminates the need to detect an actual prolonged preamble signal 47, and thus allows the VLU 10 to decide in a shorter period of time whether a peripheral device is attempting to communicate with the VLU 10. Advantageously, this reduces power consumption of the VLU 10.

A further improvement in terms of reducing overall average current use includes setting the preamble counter threshold lower than a default. Although lowering the threshold may increase the incidence of some false alarms, e.g., declaring a preamble 47 is present when one is not, on the other hand, it reduces the likelihood that a preamble 47 is present but not detected by the VLU 10.

Figure 5:
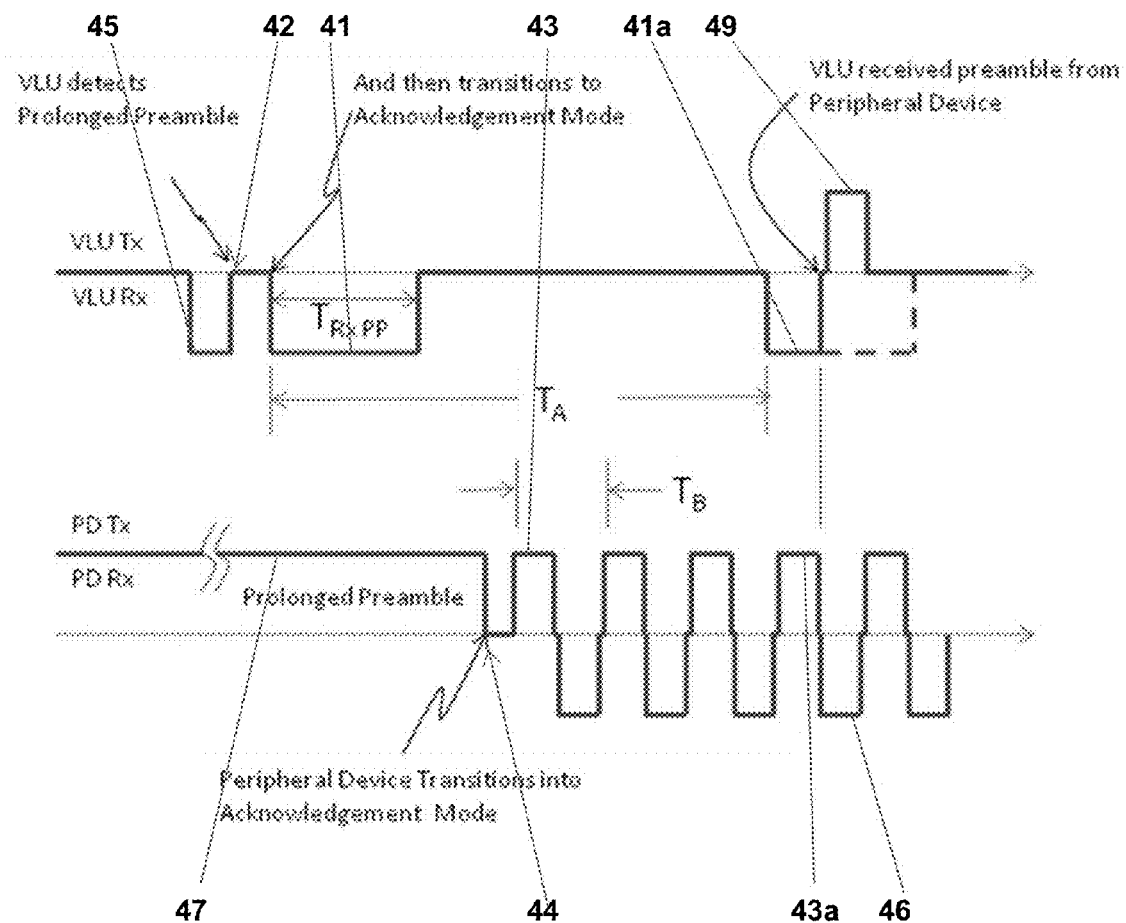
FIG. 5 illustrates a listening pattern during which a VLU and a peripheral device transition into an acknowledgement mode in accordance with various embodiments of the present invention.

Once the VLU 10 recognizes a prolonged preamble signal 47 from a peripheral device (regardless of whether the VLU 10 and the peripheral device(s) are already linked), the other components of the VLU 10, e.g., the transmitter portion, wake up and each of the VLU 10 and the peripheral device(s) transition to an acknowledgement mode (STEPS 5A and 5B). FIG. 5 illustrates the transition from the discovery to the acknowledgement mode for both systems. More specifically, after the trailing edge 42 of its duty cycle or listening pattern 45, the VLU 10 acknowledges that it has detected the "prolonged preamble" signal 47 and prepares to receive authentication information from the peripheral device. For example, in order to receive authentication information from the peripheral device, the listening period 41 of the receiver portion of the VLU 10 changes so that the receiver portion of the VLU 10 begins to listen for an authentication signal from the peripheral device for $T_{Rxpp}$ seconds every $T_A$ seconds, wherein $T_{Rxpp}$ is temporally longer that $T_{listen}$ and $T_A$ is temporally shorter than $T_p$. Concurrently or substantially concurrently, at the trailing edge 44 of the "prolonged preamble" signal 47, the peripheral device immediately transitions into an authentication mode (STEP 5B) characterized by the transmitter portion of the peripheral device transmitting an authentication signal 43, e.g., a special code, and the receiver portion of the peripheral device listening 46 for an acknowledgement signal 49 from the VLU 10. The peripheral device's authentication mode of operation occurs over a cyclical period of $T_B$ seconds, wherein, as shown in FIG. 5, $T_B$ is temporally shorter than both $T_{Rxpp}$ and $T_A$.

At some point, during one of its acknowledgment phase listening periods $T_{Rxpp}$ 41a, the receiver portion of the VLU 10 receives the peripheral device's broadcasted authentication signal 43a. In order to authenticate the "secret code" signal (STEP 6), a processing device in the VLU 10 compares the received authentication code(s) 41a with an authentication code(s) stored in memory for the purpose of such a comparison. If the stored code and the transmitted code match, the VLU 10 transmits timing information 49, e.g., a listening pattern $T_p$, (STEP 7) to the peripheral device. The timing information containing in the VLU signal 49 allows the peripheral device to exchange data with or transfer data to the VLU 10 at some point in the future. Once the receiver portion of the peripheral device receives 46 the signal containing the timing information 49, the VLU 10 and the peripheral device are linked. Linked peripheral devices may synchronize their clocks with the VLU 10 (STEP 22).

Figure 6:
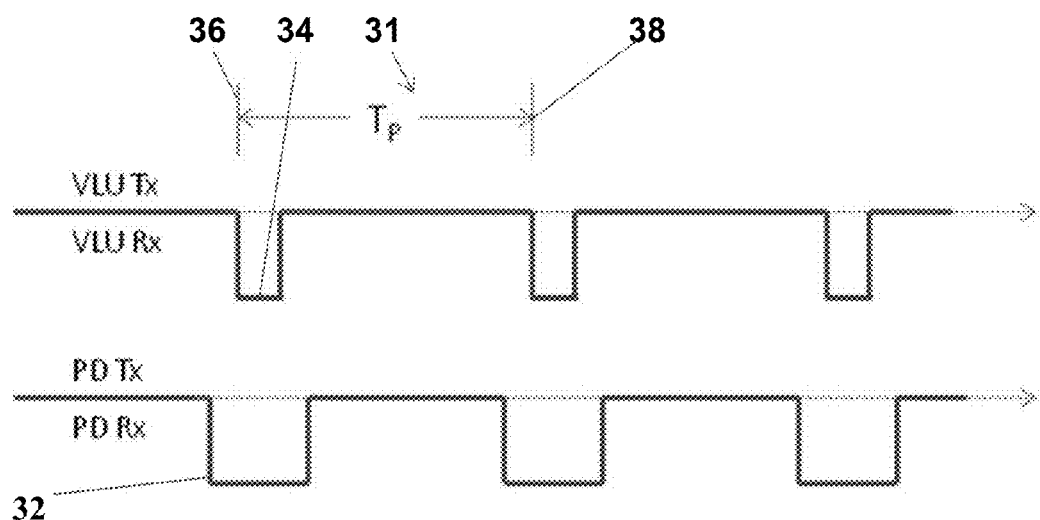
FIG. 6 illustrates a boundary interval listening pattern in which neither the VLU nor the peripheral device initiates an exchange of data in accordance with various embodiments of the present invention.

As shown in FIG. 6, during the third phase, the receiver portions of the linked peripheral device(s) and the VLU 10 listen for a signal from the other (not shown) indicating that the other desires to initiate a data exchange/transfer. It should be noted that, generally, the VLU 10 rarely transmits data. Hence, for the most part, the exchange phase primarily consists of the receiver portion of the VLU 10 listening for initiation transmissions from the transmitter portion of any linked peripheral device(s). Moreover, the need for linked peripheral devices to synchronize their clocks with the VLU 10 (STEP 22) is obvious.

Importantly, the timing information contained in the timing information signal 49 from the VLU 10, establishes the listening pattern $T_p$ for each of the VLU 10 and the peripheral device(s). The listening period 32 of the receiver portion of the peripheral device(s) is temporally longer than the listening period 34 of the receiver portion of the VLU 10 to take into account some latency in the VLU 10 that is permitted to provide lower power needs.

At some point while the devices are linked, the peripheral device—or the in some cases the VLU 10—will initiate a data exchange/transfer. The exchange of packets of data is referred to as Link Monitoring Packet Exchange (LMPX), which is also the method used to monitor connectivity. Data can be exchanged in an LMPX; however, the amount of data exchanged at any one time is limited to about 1 kilobyte. As a result, data transfers greater than about 1 kilobyte, are done at multiple reserveable intervals between $T_p$ boundaries as described below.

Still referring to FIG. 6, $T_p$ boundaries 36 and 38 refer to the edges of the $T_p$ listening period 31. There are two types of timing intervals for data exchange between a peripheral device(s) and a VLU 10. The first timing interval type occurs at or about any $T_p$ boundary. The second timing interval type occurs at an interval slightly after an $NT_p$ boundary, where N is an assignable integer (N=2, 3, . . . ) that varies for each peripheral device but that is unique to a discrete peripheral device. For example, referring to FIG. 1, the N-value for the GSM 11 can be N=2; the N-value for the alarm system 12 can be N=3; the N-value for the GPS 16 can be N=5; and so forth. The use of prime numbers for the N-value prevents redundancies. Regardless of the timing interval type, whenever data is exchanged/transferred between the VLU 10 and a linked peripheral device(s), the exchange/transfer will occur at $MT_p$ second intervals, where M is an integer (M=1, 2, 3, . . . ).

For the first timing interval type, data exchange, whether initiated by the VLU 10 or by the peripheral device(s), will occur at or about a $T_p$ boundary. "At or about" a $T_p$ boundary acknowledges the fact that, due to power up delays, i.e., "wake-up," the receiver portion of the VLU 10 may not be able to listen for a transmission from a peripheral device(s) precisely at $T_p$. Or that, because the VLU 10 is adapted to "listen-before-talk," there will likely be a short interval after a $T_p$ boundary before the VLU 10 transfers data. This is shown in FIG. 8, discussed in greater detail below.

Whether or not a data "exchange" occurs depends on whether or not either the VLU 10 or the peripheral device(s) initiates an exchange and, moreover, whether the VLU 10 receives the data from the initiating peripheral device(s) and vice versa. In short, both sides of the link must exchange data, which is not to say that either side cannot transfer data. As a result, if either the VLU 10 or a peripheral device(s) does not initiate a data exchange, there will be no data exchange and the LU 10 and the linked peripheral device(s) will continue to listen for initiation signals. This condition is illustrated in FIG. 6. The receiver portions of the VLU 10 and the peripheral device are each listening in a receiving, i.e., "listening", only mode. Neither is transmitting to the other. Neither is signaling that it is initiating an exchange/transfer of data. Hence, there is no data transmission. It should be noted in FIG. 6 that, although the listening pattern $T_p$ for each receiver portion is the same, the receiver portion of the peripheral device listens for a slightly longer length of time than the receiver portion of the VLU 10, to accommodate and/or take into account any uncertainty in VLU timing. Preferably, the additional listening time of the peripheral device listening period 32 is adapted to occur before and after the listening period 34 of the VLUL 10.

Figure 7:
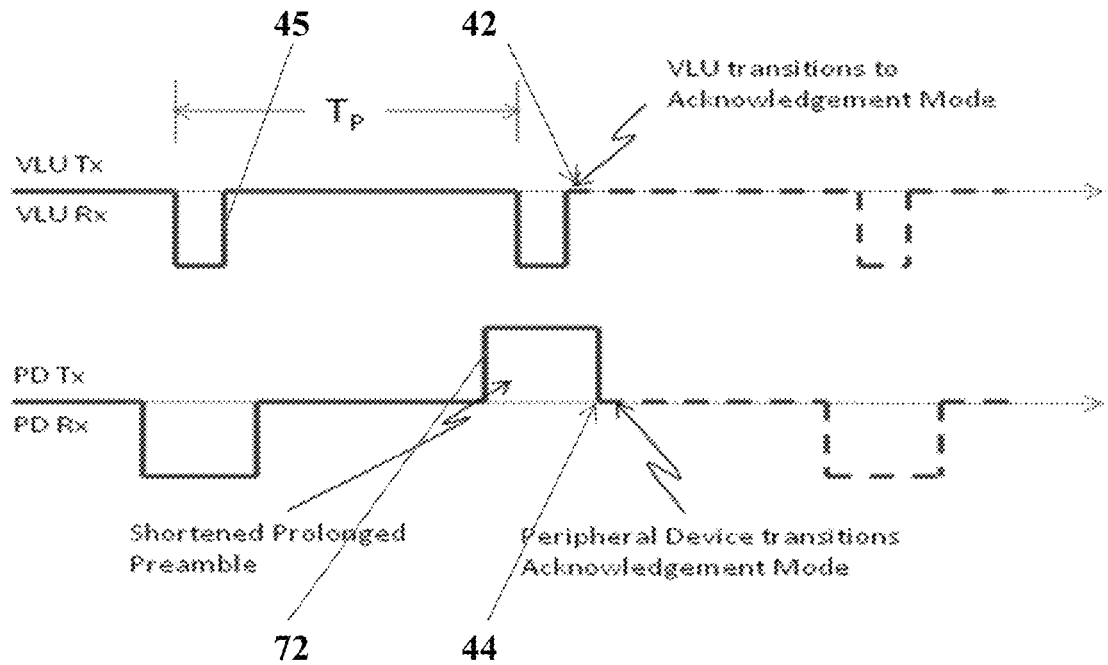
FIG. 7 illustrates a boundary interval listening pattern in which a peripheral device initiates an exchange of data in accordance with various embodiments of the present invention.

FIG. 7 illustrates the case of a peripheral device initiating a data exchange with a VLU 10. An intention to initiate a data exchange manifests by the peripheral device transmitting shortened prolonged preamble signals 72 (FIG. 2B, STEP 8). After the peripheral device initiates an intention to exchange data (STEP 8), the VLU 10 can either receive the data in a one-way transaction or can exchange, i.e., receive and transmit, data in a bilateral exchange (STEP 9). For a one-way data transfer from the peripheral device to the VLU 10, the VLU 10 is adapted to receive these data from the peripheral device after receiving a shortened prolonged preamble signal 72 by, first, transitioning to the acknowledgement mode (STEP 10), e.g., at the trailing edge of the duty cycle 42, and by then having the peripheral device transmit and the VLU 10 receive the data (STEP 11) at or about a $T_p$ boundary. An example of a one-sided transfer of data from the initiating peripheral device to the VLU 10 may occur if the alarm system 12 wanted to communicate an alarm status to the LVU 10 for which the alarm system 12 needs no data in return. For a bilateral exchange (STEP 9), after receiving the "shortened prolonged preamble" signal 72, the VLU 10 is adapted to receive these data from the peripheral device and to transmit its own data packets to the peripheral device (STEP 12) at or about a $T_p$ boundary.

Figure 8:
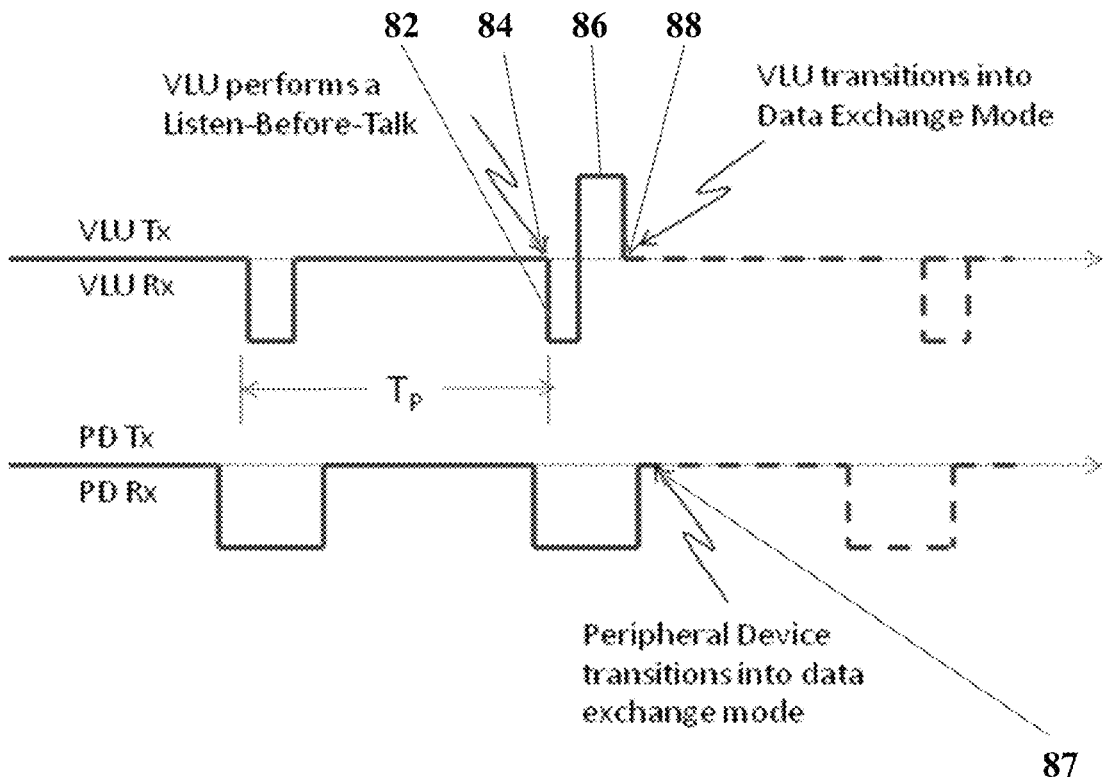
FIG. 8 illustrates a boundary interval listening pattern in which the VLU initiates an exchange of data in accordance with various embodiments of the present invention.

Referring to FIG. 8, if VLU 10 initiates a data transfer or exchange, the VLU 10 is adapted to listen for a pre-determined period of time 84 before generating an initiation signal packet 86. If the VLU 10 does not detect an initiation signal from a peripheral device(s), the transmitter portion of the VLU 10 transmits a signal packet 86 to the peripheral device indicating that the VLU 10 is initiating an exchange data (STEP 13). This is referred to as a "listen-before talk" operation. An example of a VLU-initiated data transfer includes transmitting a signal to immobilize the motor vehicle. After the trailing edge 88 of the VLU's transmission, the VLU 10 transitions into a data exchange mode (STEP 13). Similarly, at the trailing edge 87 of the peripheral device's listening period, having received the VLU's initiation signal 86, the receiver portion of the peripheral device transitions into a data receipt mode (STEP 14) and the exchange/transfer may take place at or about a $T_p$ boundary. If the peripheral device is incapable of receiving data from the VLU 10, there is no data transferred.

The second timing interval type for data exchange between linked devices occurs at a reservable $NT_p$ boundary. In some embodiments, to ensure that any broken links are detected as soon as possible, e.g., before an alarm condition, the links are monitored by the VLU 10, e.g., using an LMPX that occurs every $NT_p$ seconds, where the integer N can be set by the peripheral device and verified by the VLU 10. As previously mentioned, each peripheral device can have a different value of N. The assignment value of N takes into account the required frequency of link checks for a corresponding peripheral device. For example, some peripheral devices, e.g., alarm devices, may warrant frequent checks, e.g., every 10 seconds, while other peripheral devices, e.g., an on-board diagnostic monitor, may only require monitoring every four hours. A benefit of increasing $NT_p$ is that the average VLU current generally decreases with increasing $NT_p$.

Figure 9:
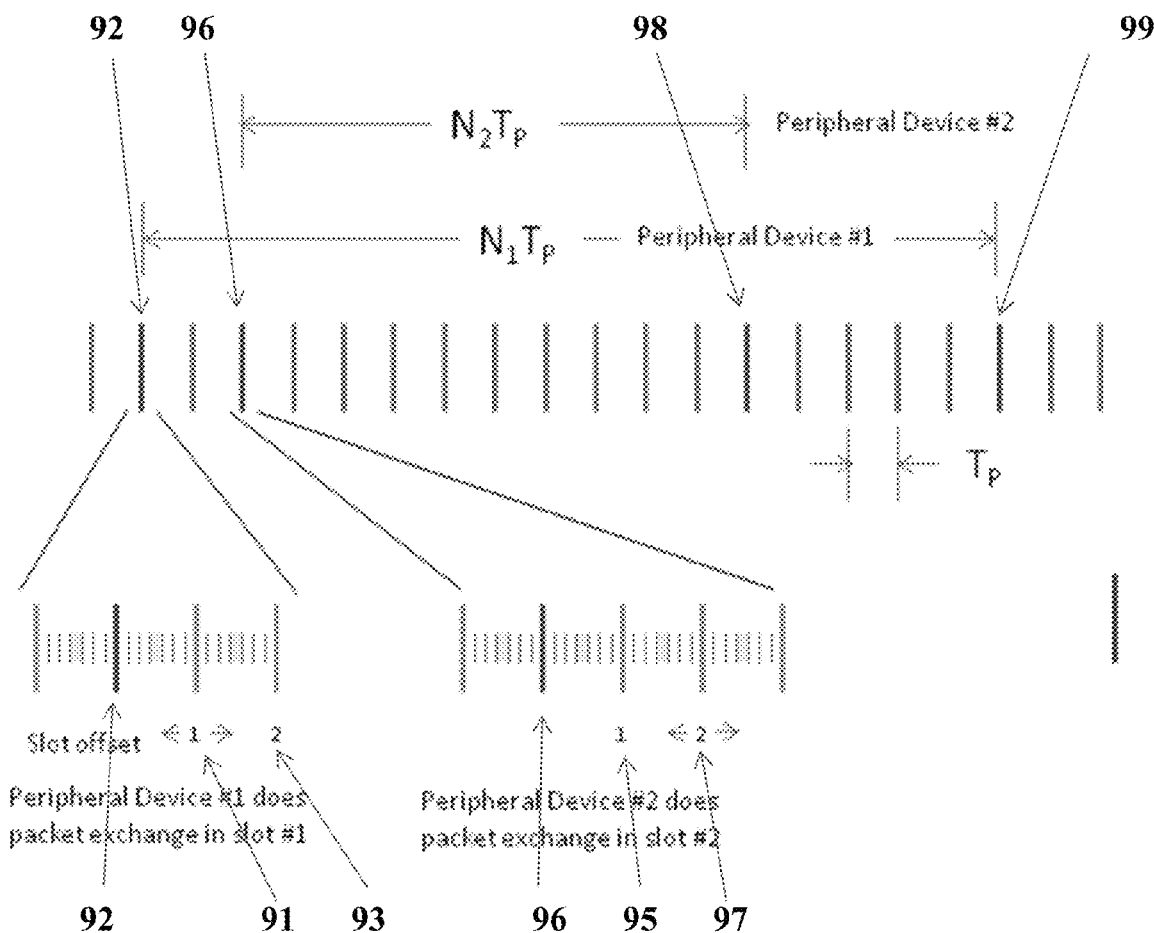
FIG. 9 illustrates assignable time slots for packet exchanges at a pair of $NT_p$ boundaries in accordance with various embodiments of the present invention.

FIG. 9 illustrates the distinction between $T_p$ boundaries and $NT_p$ boundaries. More specifically, the $N_1 TP$ boundaries for a first peripheral device (PD1) occur at reference numbers 92 and 99 and the $N_2 TP$ boundaries for a second peripheral device (PD2) occur at reference numbers 96 and 98. The N-value of the first peripheral device ($N_1$) is greater than the N-value of the second peripheral device ($N_2$). Furthermore, it is shown that these boundaries are purposely not temporally aligned. After each $NT_p$ boundary 92 and 96, there are a plurality of assignable time slots 91, 93, 95, and 97 during which data packets can be exchanged from a pre-designated peripheral device to the VLU 10. For example, at the $N_1 T_p$ boundary 92, there is a first time slot 91 and a second time slot 93 while at the $N_2 T_p$ boundary 96, there is a first time slot 95 and a second time slot 97. Recalling that, upon linking with each of the first and second peripheral devices (PD1 and PD2), the VLU provides the $T_p$ timing information (STEP 7), the VLU 10 is further adapted to assign each peripheral device a unique time slot (STEP 15). For example, the first peripheral device (PD1) can be assigned to perform LMPX in a first time slot 91 after the first peripheral device's $NT_p$ boundary 92 and the second peripheral device (PD2) can assigned to perform LMPX in a second time slot 97 after the second peripheral device's $NT_p$ boundary 96, or vice versa, etc. Advantageously, time slot assignments are designed to avoid collisions at and after the various $NT_p$ boundaries.

Figure 10:
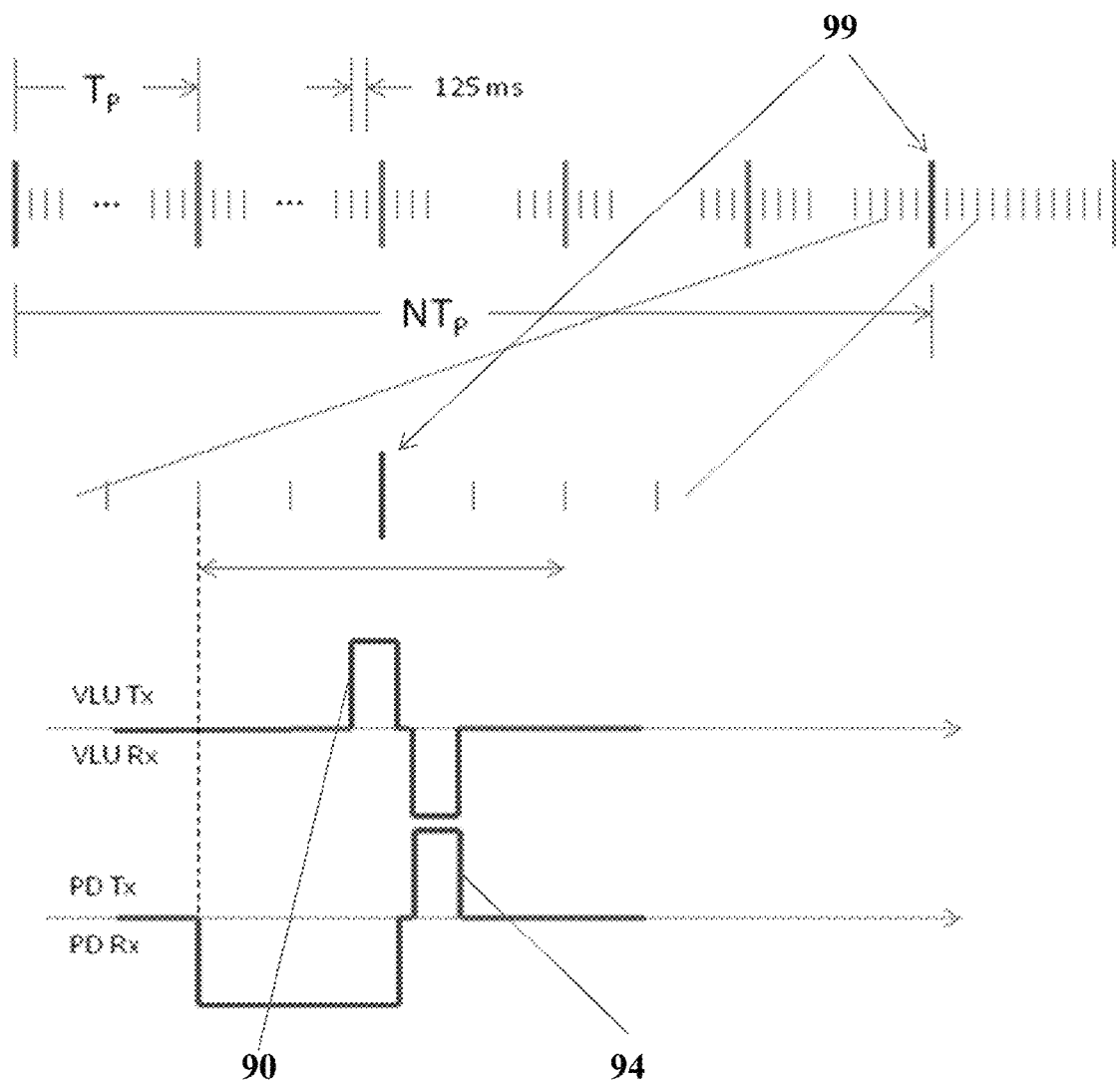
FIG. 10 illustrates a Link Monitoring Packet Exchange between a VLU and a single peripheral device in accordance with various embodiments of the present invention.

An illustrative LMPX between a VLU 10 and a single peripheral device at an $NT_p$ boundary 99 is illustrated in FIG. 10. Referring also to FIG. 2B, the LMPX is initiated by the VLU 10, e.g., by transmitting a short packet transmission 90 (STEP 16), slightly before the $NT_p$ boundary 99. After the peripheral device receives the short packet transmission 90 from the VLU 10, the peripheral device is adapted to transmit its own data packet 94 (STEP 17) slightly after the $NT_p$ boundary 99, which the VLU 10 receives. Advantageously, by allowing the VLU 10 to initiate the exchange and to transmit data first (STEP 16), i.e., the short packet transmission 90, VLU current and power needs are minimized as compared to a data exchange in which a peripheral device transmits first. This is, in part, due to the uncertainty between the clocks in the VLU 10 and the peripheral device.

Figure 11:
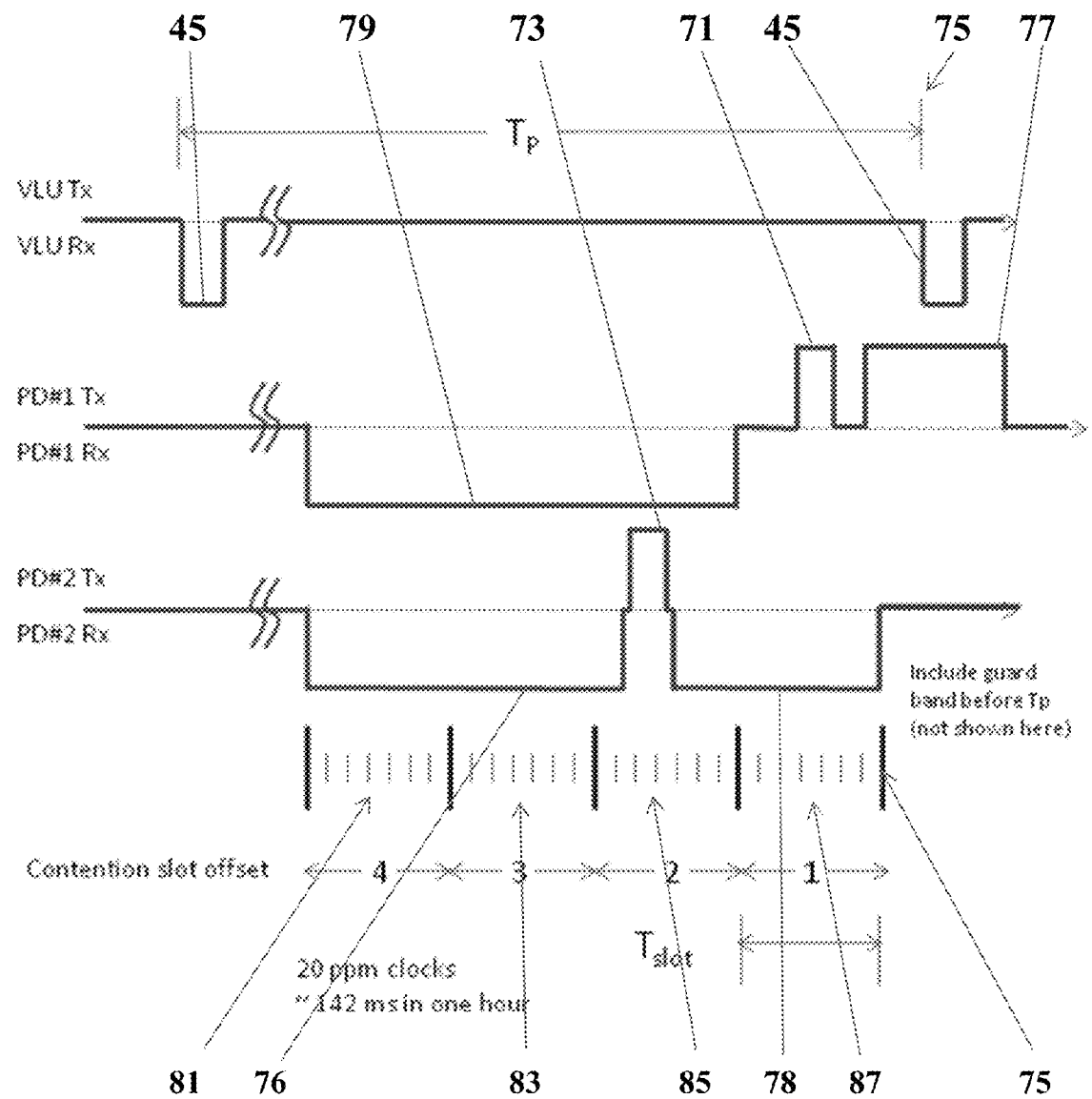
FIG. 11 illustrates a Link Monitoring Packet Exchange between a VLU and multiple peripheral devices in accordance with various embodiments of the present invention.

When multiple peripheral devices are linked to a common VLU 10 via a WLAN 20 there may be instances in which more than one peripheral device may initiate a data exchange at the same time, i.e., at or about the same $T_p$ boundary. In some embodiments, this can be avoided by adapting peripheral devices to broadcast their intention to perform a data exchange to other peripheral devices, e.g., prior to a VLU's $T_p$ boundary. This is illustrated in FIG. 11, in which there are two peripheral devices (PD1 and PD2) linked to a VLU 10. Recall that the VLU 10 assigns each peripheral device a discrete time slot before the $T_p$ boundary 75 (STEP 15). For illustrative purposes only, four assignable contention time slots 81, 83, 85, and 87 are shown. The first peripheral device (PD1) is assigned a first time slot 87; the second peripheral device (PD2) is assigned a second time slot 85; and any other peripheral devices may be assigned the third and fourth time slots 83 and 81, respectively. Preferably, the assignable contention time slots 81, 83, 85, and 87 occur during some portion(s) of the listening pattern $T_p$ when the receiver portion of the VLU 10 is not receiving, i.e., sleeping, but during which the receiver portion of all of the peripheral devices are listening 76, 78, and 79. This delineation facilitates peripheral devices broadcasting to each other an intention to transmit at the next $T_p$ boundary, i.e., during the VLU's listening interval 45. Moreover it facilitates resolving contentions according to predefined rules for precedence.

Indeed, a set of rules or protocol can be established in advance to determine the sequence or precedence of transmission among competing or contending peripheral devices. These rules are based on the time slot 81, 83, 85 or 87 to which each peripheral device is assigned when the link to that peripheral device is first established (STEP 15).

When multiple peripheral devices (PD1, PD2) initiate a data exchange with the VLU 10, each corresponding peripheral device is adapted to transmit an intent signal (STEP 18) to all other peripheral devices during the corresponding peripheral device's assigned time slot. For example, as shown in FIG. 11, the first peripheral device (PD1) signals an intent to exchange data (STEP 18) by transmitting an intent signal 71 during its assigned, i.e., the first, time slot 87 while the second peripheral device (PD2) signals an intent to exchange data (STEP 18) by transmitting an intent signal 73 during its assigned, i.e., the second, time slot 85. The second peripheral device (PD2) would have received the intent signal 71 from the first peripheral device (PD1) during listening period 78 (STEP 19) and the first peripheral device (PD1) would have received the intent signal 73 from the second peripheral device (PD2) during listening period 79 (STEP 19).

Once all of the peripheral devices have signaled an intention to initiate an exchange of data prior to the $T_p$ boundary, only one of the peripheral devices will be able to transfer/exchange data at the next $T_p$ boundary to avoid interference. Applying the set of rules or protocol determines which of the peripheral devices will transfer/exchange at the next $T_p$ boundary (STEP 20). If the rules or protocol provide that the first peripheral device (PD1) has precedence over the second peripheral device (PD2), then, as shown in FIG. 11, having already transmitted an intent signal 71 during its assigned time slot 87, slightly before the $T_p$ boundary 75, the first peripheral device (PD1) transmits an LMPX packet 77 to the receiver portion of the VLU 10 (STEP 21). Because this occurs at or about a $T_p$ boundary 75, the receiver portion of the VLU 10 receives the LMPX packet 77 during its listening interval 45. Although, not shown, the LMPX packet from the second peripheral device (PD2) would be transmitted at a future $T_p$ boundary.

Figure 12:
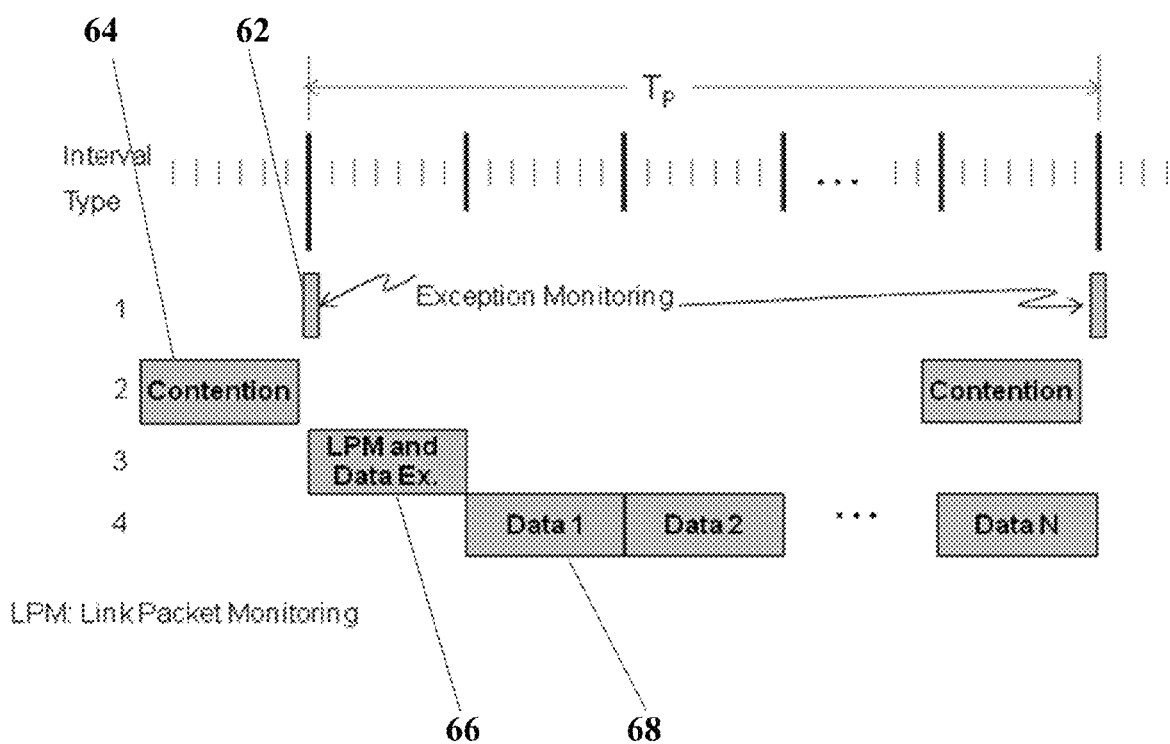
FIG. 12 is a schematic of four interval types or time slots in accordance with various embodiments of the present invention.

Mention has been made that the illustrative wireless communication protocol recognizes four types of "intervals" or "slots." Three of these include $T_p$ slots (or "exception monitoring" and "discovery") slots 62, link package monitoring slots 66, and data exchange slots 68, which are shown in FIG. 12. The fourth interval or time slot type 64, i.e., contention time slots 81, 83, 85, and 87, is shown in FIG. 11 and FIG. 12. Exception monitoring during exception monitoring slots 62 can be carried out on a first frequency band F1; contention on a second frequency band F2, link packet monitoring on a third frequency band F3, and the data exchange on a fourth frequency band F4. The allocation of these bands/channels is not fixed and is flexible. Although some of the four intervals may be assigned that partially overlap or that have the same frequency bands/channels, i.e., F2=F3=F4, the exception monitoring slot should always be assigned a different frequency band/channel than the frequencies of any of the other intervals/slots, i.e., F1≠F2, F3 or F4. Because time slots are used, the wireless communication protocol requires synchronization, to effectively offload some current usage in the VLU 10. As a result, peripheral devices should be adapted to adjust their "clocks" periodically (STEP 22).

Figure 13:
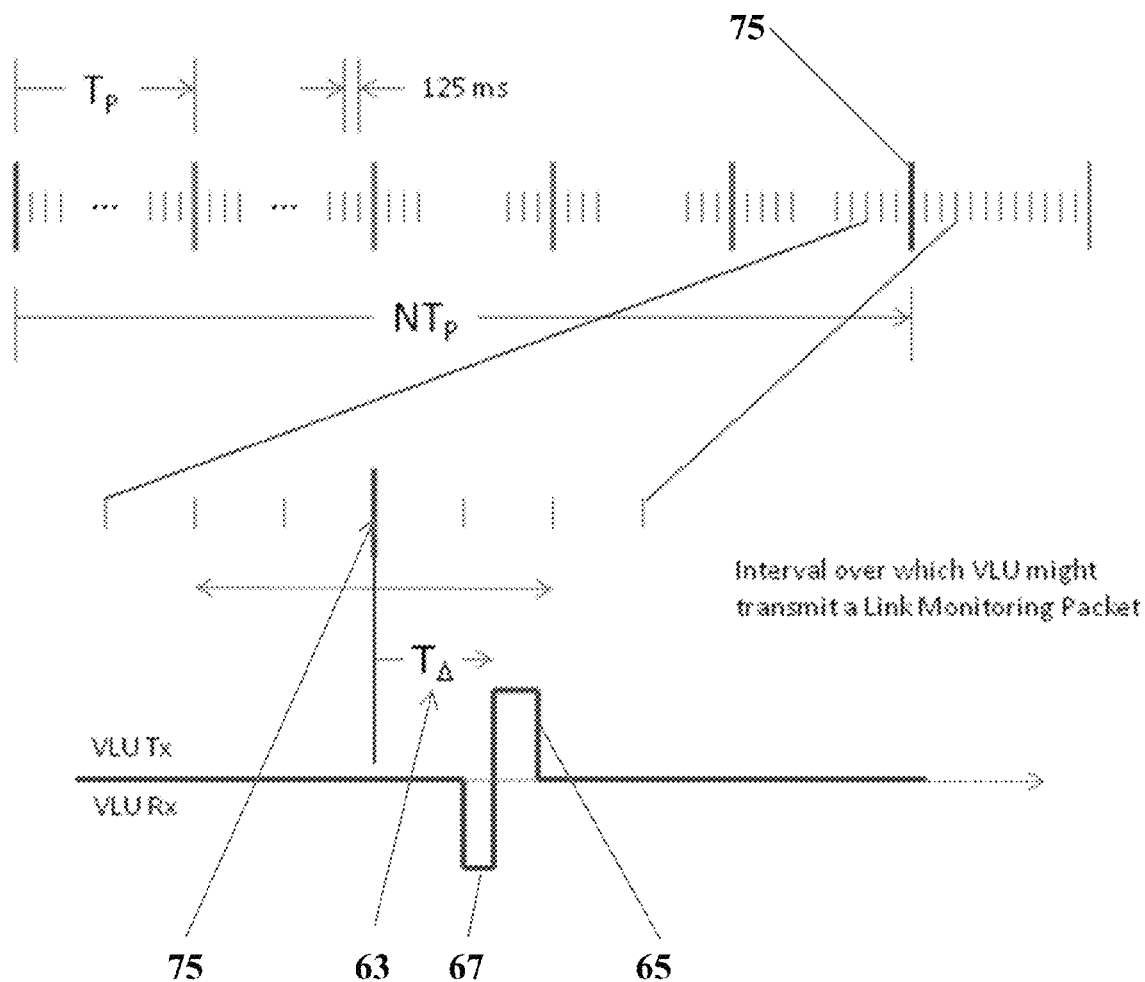
FIG. 13 illustrates a pre-emption interval over which a VLU may perform a lower-priority Link Monitoring Packet Exchange in accordance with various embodiments of the present invention.

Some tasks, by design, are meant to have a higher priority of transmission or exchange than other tasks. Hence, higher priority exchanges are meant to be transmitted before lower priority tasks. As previously mentioned, a set of rules or protocol can be established to determine the sequence or precedence of transmission among competing peripheral devices. In short, absent any higher priority exchanges, the VLU 10 will perform an exchange at or about the $T_p$ boundary. However, the VLU 10 will not perform a lower-priority LMPX at the $T_p$ boundary until all higher-priority tasks are completed. To accommodate these rules and protocols, a VLU 10 transmitting lower-priority data, e.g., via an LMPX, is further adapted to estimate a slot offset from the VLU's nominal $T_p$ boundary. For example, referring to FIG. 13, the VLU 10 is adapted to estimate an offset or deviation ($T_A$) 63, which offset or deviation corresponds to a length of time beyond the nominal $T_p$ boundary 75 during which the VLU 10 might still transmit the LMP 65. In short, the VLU 10 performs a "listen-before-talk" operation, i.e., listening for a length of time 67 before transmitting a data packet 65. The VLU 10 transmits the offset or deviation ($T_A$) information to the peripheral device(s) (STEP 7) so that the peripheral device(s) knows not to attempt to synchronize on a packet that was delayed from a transmission at or about the $T_p$ boundary 75 because the transmission may have been preempted by a higher-priority task.

Figure 14:
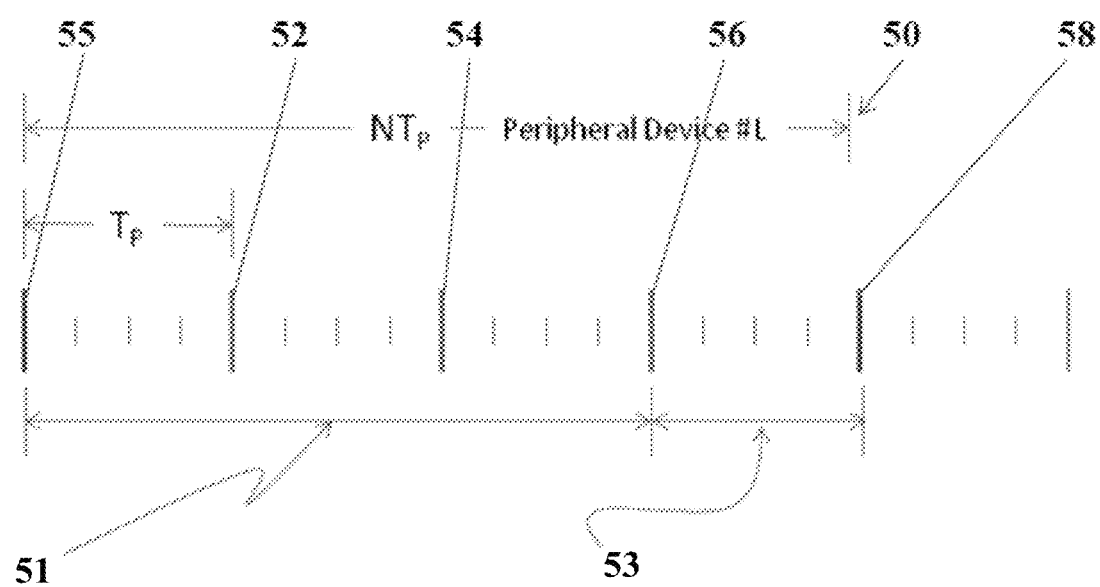
FIG. 14 is a schematic for communicating event occurrence signals in accordance with various embodiments of the present invention.
Figure 15:
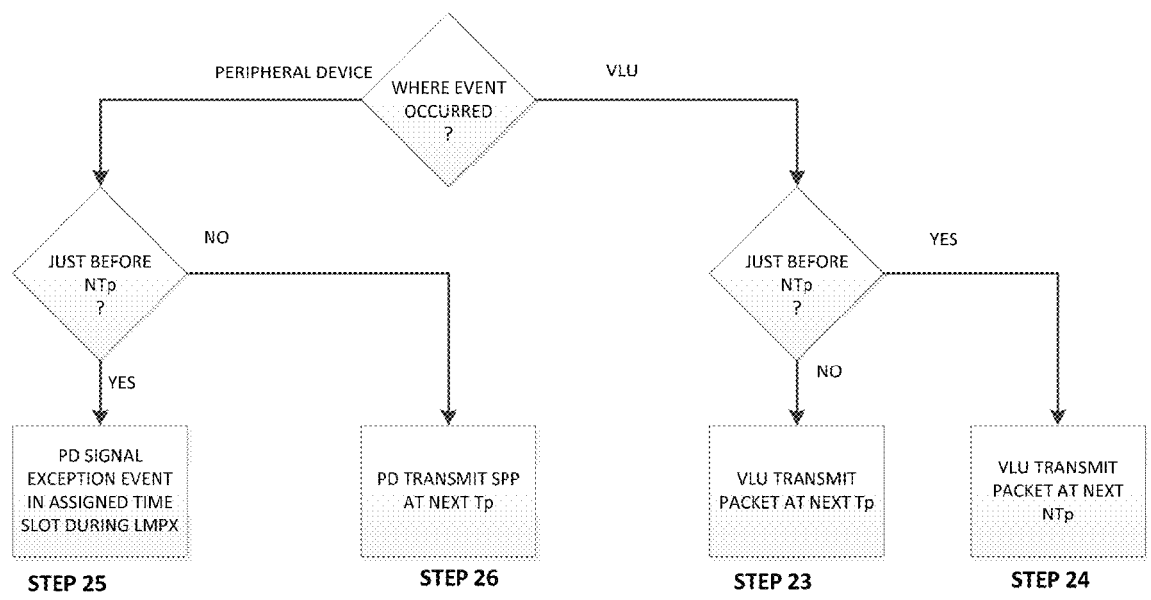
FIG. 15 shows an event occurrence flow chart in accordance with various embodiments of the present invention.

Exception events, e.g., an alarm condition, can occur in any of the devices in the WLAN 20 and at any time. As a result, the timing of the exception event and where the exception event originates determines what is transmitted and by which of the previously described communication modes is it transmitted. Referring to FIG. 14, an $NT_p$ interval 50 and $NT_p$ boundaries 55 and 58 for a peripheral device (PD#L) are shown. The $NT_p$ interval 50 is divided into a first interval 51 and a second interval 53. As shown, the second interval 53 corresponds to a time interval immediately before an $NT_p$ boundary 58 while the first interval 51 corresponds to everything but the second interval 53 immediately before an $NT_p$ boundary 58. Referring to FIG. 15, if an exception event occurs in the VLU 10 during the second interval 53, i.e., during the time slot 53 immediately before the $NT_p$ boundary 58, the transmitter portion of the VLU 10 will transmit a data packet at the next $NT_p$ boundary 58 of the corresponding peripheral device (PD#L) during the corresponding peripheral device's assigned time slot (STEP 24). However, if the exception event occurring in the VLU 10 occurs during the first interval 51, the transmitter portion of the VLU 10 will transmit a data packet at the VLU's next $T_p$ boundary 52, 54 or 56 (STEP 23).

If, on the other hand, an exception event occurs in the peripheral device (PD#L) one of two things occurs. If the exception event occurs in the peripheral device (PD#L) during the second interval 53 immediately before an NT$_p$ boundary 58, the peripheral device (PD#L) can signal the presence of an exception condition by transmitting an exception occurrence signal within the peripheral device's assigned time slot (STEP 25). If an LMPX were already scheduled, the exception occurrence signal may be concatenated to the data packet. Advantageously, in this instance, there is no need to send a shortened prolonged preamble across the NT$_p$ boundary 58 of the peripheral device (PD#L). If, on the other hand, if the exception event occurring in the peripheral device (PD#L) occurs during the first interval 51, the peripheral device (PD#L) signals the presence of an exception condition by transmitting an exception occurrence signal that has been concatenated to a shortened prolonged preamble (STEP 26) at the next T$_p$ boundary 52, 54 or 56.

Having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The invention claimed is:

1. A method of wireless communication between a vehicle locating unit and a plurality of peripheral devices that are disposed on or in a same object, the vehicle locating unit and each of the plurality of peripheral devices having a receiver and a transmitter, the method comprising:

adapting the transmitter of each of the plurality of peripheral devices to generate transmission signals to be received by the receiver of the vehicle locating unit;

generating transmission signals by at least one of the plurality of peripheral devices, wherein the transmission signals from any of the plurality of peripheral devices include a signal having a prolonged preamble providing indicia of a desire to communicate data with the vehicle locating unit;

adapting the receiver of the vehicle locating unit to listen for the transmission signals from any of the plurality of peripheral devices for a first period of time during a second period of time that is longer than the first period of time;

estimating a likelihood that a received signal corresponds to the signal having a prolonged preamble using a counter;

acknowledging detected transmission signals from any of the plurality of peripheral devices, wherein acknowledging detected transmission signals includes listening for an authentication code from a corresponding source of detected transmission signals for a third period of time during a fourth period of time, wherein the third period of time is longer than the first period of time and the fourth period of time is shorter than the third period of time and wherein the authentication code is transmitted by the corresponding source of detected transmission signals during a transmit-and-receive cycle having a cyclical time that is shorter than the third period of time;

upon acknowledgement, establishing a communication link between the vehicle locating unit and the corresponding source of detected transmission signals; and communicating data between the vehicle locating unit and the corresponding source of detected transmission signals in accordance with discrete timing information.

2. The method as recited in claim 1, wherein the signal having a prolonged preamble has a transmission length longer than the second period of time.

3. The method as recited in claim 1, wherein acknowledging detected transmission signals and listening for authentication information from the corresponding source of detected transmission signals include:

detecting transmission signals from any of the plurality of peripheral devices;

waking up the transmitter and a memory in the vehicle locating unit;

preparing the receiver of the vehicle locating unit to receive the authentication information from the corresponding source of the detected transmission signals; and identifying the corresponding source of detected transmission signals using the authentication information.

4. The method as recited in claim 3, wherein identifying the corresponding source of detected transmission signals includes comparing the received authentication information to authentication information stored in the memory.

5. The method as recited in claim 1, wherein listening for the authentication information from any of the plurality of peripheral devices includes listening for the authentication code that is unique to a corresponding peripheral device.

6. The method as recited in claim 1, wherein establishing a communication link includes transmitting discrete timing information for communication of data between the vehicle locating unit and the corresponding source of detected transmission signals.

7. The method as recited in claim 6, wherein transmitting discrete timing information includes transmitting at least one of the following:

transmitting a listening pattern, having at least one timing period of a pre-established length delineated between a first boundary and a second boundary, on which transmissions between the vehicle locating unit and the corresponding source of detected transmission signals will be timed;

transmitting a discrete time slot within the listening pattern that is unique to the corresponding source of detected transmission signals during which transmissions between the vehicle locating unit and the corresponding source of detected transmission signals will be timed; and transmitting a vehicle locating unit listening time offset within the listening pattern during which transmissions between the vehicle locating unit and the corresponding source of detected transmission signals will be timed.

8. The method as recited in claim 7, wherein the corresponding source of the detected transmission signals synchronizes its timing clock in accordance with the transmitted listening pattern.

9. The method as recited in claim 8, wherein the discrete time slot occurs within one or two timing periods after the first boundary of the timing period.

10. The method as recited in claim 7, wherein the time offset occurs within one or two timing periods after the first boundary of the timing period.

11. The method as recited in claim 1, wherein communicating data includes at least one of the corresponding source of the detected transmission signals or the vehicle locating unit transmitting an initiation signal approximately at a boundary of a timing period.

12. The method as recited in claim 11, wherein communicating data includes at least one of transmitting data from the corresponding source of the detected transmission signals to the vehicle locating unit and transmitting data from the vehicle locating unit to the corresponding source of the detected transmission signals at a next boundary of a timing period.

13. The method as recited in claim 11, wherein communicating data further includes:
  assigning a unique N-value to each of the corresponding sources of detected transmissions, wherein N is an integer greater than one;
  reserving a unique data transfer period for each corresponding source of detected transmission signals, wherein the unique data transfer period comprises N number of timing periods delineated between a unique first boundary and a unique second boundary that no other peripheral device has; and
  transmitting data from at least one of the corresponding source of detected transmission signals to the vehicle locating unit or from the vehicle locating unit to the corresponding source of detected transmission signals within one or two timing periods after the unique second boundary.

14. The method as recited in claim 1 further comprising monitoring a connection link between the vehicle locating unit and the corresponding source of detected transmission signals using a linked monitoring packet exchange.

15. The method as recited in claim 1 further comprising:
  adapting each of the plurality of peripheral devices to transmit an intent signal to other peripheral devices to announce an intention to communicate data at a next timing boundary; and
  adapting each of the plurality of peripheral devices to listen for the intent signal from another peripheral device.

16. The method as recited in claim 15, wherein, after a peripheral device of the plurality of peripheral devices has signaled an intention to communicate data, transmitting a data packet from the discrete device to the vehicle locating unit at the next timing boundary.

17. The method as recited in claim 15 further comprising adapting each of the plurality of peripheral devices to avoid synchronizing on a data exchange packet whose transmission is delayed because timing for the communication of data was delayed by a communication of data having a higher priority.

18. The method as recited in claim 1 further comprising establishing a priority for timing a communication of data between the vehicle locating unit and the plurality of peripheral devices.

19. The method as recited in claim 1 further comprising determining a location and a temporal point of occurrence of an exception event.

20. The method as recited in claim 19, wherein, if the location of the occurrence of the exception event is in the vehicle locating unit, the method further comprises:
  reserving a unique data transfer period for the corresponding source of detected transmission signals, wherein the unique data transfer period comprises N number of timing periods, wherein N is an integer greater than one; each timing period has an equal temporal length; each timing period has a first and a second boundary; and the N number of timing periods of the unique data transfer period are delineated between a unique first boundary and a unique second boundary that no other peripheral device have; and
  transmitting a data package from the vehicle locating unit to the corresponding source of detected transmission signals at a next unique boundary if the exception event occurs within one timing period of the next unique boundary, otherwise transmitting the data package at a next period boundary.

21. The method as recited in claim 19, wherein if the location of the occurrence of the exception event is in any of the plurality of peripheral devices, the method further comprising:
  reserving a unique data transfer period for the corresponding source of detected transmission signals, wherein the unique data transfer period comprises N number of timing periods, wherein N is an integer greater than one; each timing period has an equal temporal length; each timing period has a first and a second boundary; and the N number of timing periods of the unique data transfer period are delineated between a unique first boundary and a unique second boundary that no other peripheral device have;
  reserving a discrete time slot during the unique data transfer period, wherein the discrete time slot is unique to the corresponding source of detected transmission signals for the purpose of data communication; and
  transmitting a data package from the corresponding source of detected transmission signals to the vehicle locating unit during the corresponding source's reserved time slot if the exception event occurs within one time period of the next unique boundary of the unique data transfer period, otherwise transmitting a shortened prolonged preamble signal from the corresponding source of detected transmission signals to the vehicle locating unit at a next time period boundary.

22. A low-power wireless communication system, the system comprising:
  a vehicle locating unit having a receiver, a transmitter, and a processing device with memory, wherein the vehicle locating unit is disposed on or in an object; and
  a plurality of peripheral devices that are disposed on or in the same object, wherein, each of the plurality of peripheral devices is adapted to generate transmission signals and to receive transmission signals,
  wherein the receiver of the vehicle locating unit is adapted to listen for the transmission signals from any of the plurality of peripheral devices for a first period of time during a second period of time that is longer than the first period of time, and
  the processing device of the vehicle locating unit is adapted to acknowledge detection of transmission signals from any of the plurality of peripheral devices, wherein acknowledging detected transmission signals includes listening for an authentication code from a corresponding source of detected transmission signals for a third period of time during a fourth period of time, wherein the third period of time is longer than the first period of time and the fourth period of time is shorter than the third period of time and wherein the authentication code is transmitted by the corresponding source of detected transmission signals during a transmit-and-receive cycle having a cyclical time that is shorter than the third period of time, to establish a communication link between the vehicle locating unit and a corresponding source of detected transmission signals via the transmitter, and to communicate data between the vehicle locating unit and the corresponding source of the detected transmission signals in accordance with discrete timing information.

23. The system as recited in claim 22, wherein the discrete timing information includes at least one of the following:
- a listening pattern, having at least one timing period of a pre-established length delineated between a first boundary and a second boundary, on which transmissions between the vehicle locating unit and the corresponding source of detected transmission signals will be timed;
- a discrete time slot within the listening pattern that is unique to the corresponding source of detected transmission signals during which transmissions between the vehicle locating unit and the corresponding source of detected transmission signals will be timed; and
- a vehicle locating unit listening time offset within the listening pattern during which transmissions between the vehicle locating unit and the corresponding source of detected transmission signals will be timed.

24. The system as recited in claim 22, wherein the each of the plurality of peripheral devices is adapted to:
- transmit an intent signal to other peripheral devices to announce an intention to communicate data at a next timing boundary;
- listen for the intent signal from another peripheral device; and
- transmit a data packet from the discrete device to the vehicle locating unit at the next timing boundary.

25. A method of wireless communication between a vehicle locating unit and a plurality of peripheral devices that are disposed on or in a same object, the vehicle locating unit and each of the plurality of peripheral devices having a receiver and a transmitter, the method comprising:
- adapting the transmitter of each of the plurality of peripheral devices to generate transmission signals to be received by the receiver of the vehicle locating unit;
- generating transmission signals by at least one of the plurality of peripheral devices, wherein the transmission signals from any of the plurality of peripheral devices includes a signal having a prolonged preamble providing indicia of a desire to communicate data with the vehicle locating unit;
- adapting the receiver of the vehicle locating unit to listen for the transmission signals from any of the plurality of peripheral devices for a first period of time during a second period of time that is longer than the first period of time;
- estimating a likelihood that a received signal corresponds to the signal having a prolonged preamble using a counter;
- acknowledging detected transmission signals from any of the plurality of peripheral devices;
- upon acknowledgement, establishing a communication link between the vehicle locating unit and a corresponding source of detected transmission signals;
- communicating data between the vehicle locating unit and the corresponding source of detected transmission signals in accordance with discrete timing information; and
- determining a location and a temporal point of occurrence of an exception event, wherein, if the location of an occurrence of the exception event is in the vehicle locating unit, the method further comprises:
- reserving a unique data transfer period for the corresponding source of detected transmission signals, wherein the unique data transfer period comprises N number of timing periods, wherein N is an integer greater than one; each timing period has an equal temporal length; each timing period has a first and a second boundary; and the N number of timing periods of the unique data transfer period are delineated between a unique first boundary and a unique second boundary that no other peripheral device have; and
- transmitting a data package from the vehicle locating unit to the corresponding source of detected transmission signals at a next unique boundary if the exception event occurs within one timing period of the next unique boundary, otherwise transmitting the data package at a next period boundary;

otherwise, if the location of an occurrence of the exception event is in any of the plurality of peripheral devices, the method further comprising:
- reserving a unique data transfer period for the corresponding source of detected transmission signals, wherein the unique data transfer period comprises N number of timing periods, wherein N is an integer greater than one; each timing period has an equal temporal length; each timing period has a first and a second boundary; and the N number of timing periods of the unique data transfer period are delineated between a unique first boundary and a unique second boundary that no other peripheral device have;
- reserving a discrete time slot during the unique data transfer period, wherein the discrete time slot is unique to the corresponding source of detected transmission signals for the purpose of data communication; and
- transmitting a data package from the corresponding source of detected transmission signals to the vehicle locating unit during the corresponding source's reserved time slot if the exception event occurs within one time period of the next unique boundary of the unique data transfer period, otherwise transmitting a shortened prolonged preamble signal from the corresponding source of detected transmission signals to the vehicle locating unit at a next time period boundary.

* * * * *